United States Patent
Koizuka et al.

(10) Patent No.: US 10,273,373 B2
(45) Date of Patent: Apr. 30, 2019

(54) INK AND METHOD FOR PRODUCING SAME, AND INK STORED CONTAINER, PRINTING METHOD, AND PRINTING APPARATUS

(71) Applicants: Yuusuke Koizuka, Shizuoka (JP); Kazukiyo Nagai, Shizuoka (JP); Tomoyuki Shimada, Shizuoka (JP); Shigeyuki Harada, Shizuoka (JP); Koichiro Oyama, Kanagawa (JP); Takuya Yamazaki, Shizuoka (JP); Akiyoshi Sabu, Shizuoka (JP); Yoshiki Yanagawa, Shizuoka (JP); Akihiko Matsuyama, Shizuoka (JP)

(72) Inventors: Yuusuke Koizuka, Shizuoka (JP); Kazukiyo Nagai, Shizuoka (JP); Tomoyuki Shimada, Shizuoka (JP); Shigeyuki Harada, Shizuoka (JP); Koichiro Oyama, Kanagawa (JP); Takuya Yamazaki, Shizuoka (JP); Akiyoshi Sabu, Shizuoka (JP); Yoshiki Yanagawa, Shizuoka (JP); Akihiko Matsuyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/454,334

(22) Filed: Mar. 9, 2017

(65) Prior Publication Data
US 2017/0267884 A1 Sep. 21, 2017

(30) Foreign Application Priority Data

Mar. 17, 2016 (JP) .................................. 2016-054450

(51) Int. Cl.
*C09D 11/107* (2014.01)
*C09D 11/322* (2014.01)
(Continued)

(52) U.S. Cl.
CPC ............... *C09D 11/107* (2013.01); *B41J 2/01* (2013.01); *C09D 11/033* (2013.01);
(Continued)

(58) Field of Classification Search
CPC ...... C09D 11/107; C09D 11/033; C09D 11/00; H02M 3/157; H02M 3/156; H02M 2001/0032; Y02B 70/16
See application file for complete search history.

(56) References Cited

U.S. PATENT DOCUMENTS 7,771,526 B2 * 8/2010 Yamamoto ............. C09D 11/38
106/31.86
8,960,885 B2 2/2015 Katoh et al.
(Continued)

FOREIGN PATENT DOCUMENTS

JP 2007-153976 6/2007
JP 2009-299005 12/2009
(Continued)

OTHER PUBLICATIONS

The abstract page of Inkjet Aqueous Ink, Ink Jet Recording Method, Ink Cartridge, and Ink Jet Recording Apparatus (U.S. Pat. No. 7,771,526), Yamamoto et al., Aug. 10, 2010 (Year: 2010).*

*Primary Examiner* — Lisa Solomon
(74) *Attorney, Agent, or Firm* — Oblon, McCelland, Maier & Neustadt, L.L.P.

(57) ABSTRACT

Provided is an ink containing water, a coloring material, and a copolymer, wherein the copolymer contains a structural unit represented by any one of general formulae (1a), (1b), and (1c) below and a structural unit containing an anionic group, (Continued)

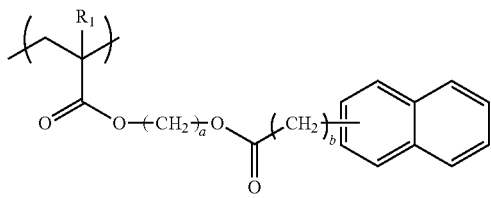

[General formula (1a)]

where $R_1$ represents a hydrogen atom or a methyl group, a represents an integer of from 6 through 10, and b represents an integer of 0 or 1,

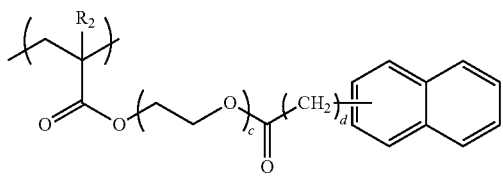

[General formula (1b)]

where $R_2$ represents a hydrogen atom or a methyl group, c represents an integer of 3 or 4, and d represents an integer of 0 or 1,

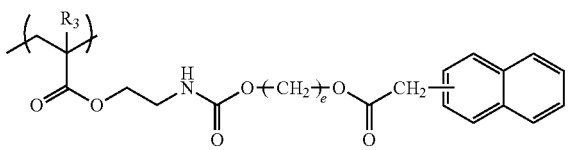

[General formula (1c)]

where $R_3$ represents a hydrogen atom or a methyl group and e represents an integer of from 2 through 10.

12 Claims, 2 Drawing Sheets

(51) Int. Cl.
C09D 11/033 (2014.01)
B41J 2/01 (2006.01)
H02M 3/157 (2006.01)
H02M 1/00 (2006.01)

(52) U.S. Cl.
CPC ........... *C09D 11/322* (2013.01); *H02M 3/157* (2013.01); *H02M 2001/0032* (2013.01); *Y02B 70/16* (2013.01); *Y02P 20/121* (2015.11)

(56) References Cited

U.S. PATENT DOCUMENTS

| | | | |
|---|---|---|---|
| 8,974,895 B2 | 3/2015 | Naruse et al. |
| 8,998,400 B2 | 4/2015 | Harada et al. |
| 9,034,091 B2 | 5/2015 | Matsuyama et al. |
| 9,217,089 B2 | 12/2015 | Nagai et al. |
| 9,234,110 B2 | 1/2016 | Katoh et al. |
| 9,359,522 B2 | 6/2016 | Matsuyama et al. |
| 9,441,129 B2 | 9/2016 | Katoh et al. |
| 2009/0131577 A1 | 5/2009 | Kato et al. |
| 2014/0072779 A1 | 3/2014 | Matsuyama et al. |
| 2014/0120331 A1 | 5/2014 | Koizuka et al. |
| 2014/0141209 A1 | 5/2014 | Koizuka et al. |
| 2014/0198160 A1 | 7/2014 | Harada et al. |
| 2015/0064425 A1 | 3/2015 | Matsuyama et al. |
| 2015/0109382 A1 | 4/2015 | Naruse et al. |
| 2015/0116421 A1 | 4/2015 | Nonogaki et al. |
| 2015/0247049 A1 | 9/2015 | Matsuyama et al. |
| 2015/0252203 A1 | 9/2015 | Matsuyama et al. |
| 2015/0291817 A1 | 10/2015 | Katoh et al. |
| 2015/0307734 A1 | 10/2015 | Nonogaki et al. |
| 2015/0376425 A1 | 12/2015 | Hakiri et al. |
| 2016/0017075 A1 | 1/2016 | Harada et al. |
| 2016/0032037 A1 | 2/2016 | Harada et al. |
| 2016/0075892 A1 | 3/2016 | Harada et al. |
| 2016/0102162 A1 | 4/2016 | Harada et al. |
| 2016/0130452 A1 | 5/2016 | Katoh et al. |
| 2016/0168292 A1 | 6/2016 | Fukuoka et al. |
| 2016/0222234 A1 | 8/2016 | Matsuyama et al. |
| 2016/0362572 A1 | 12/2016 | Matsuyama et al. |

FOREIGN PATENT DOCUMENTS

| | | |
|---|---|---|
| JP | 5512240 | 4/2014 |
| JP | 2015-117354 | 6/2015 |

\* cited by examiner

INK AND METHOD FOR PRODUCING SAME, AND INK STORED CONTAINER, PRINTING METHOD, AND PRINTING APPARATUS

CROSS-REFERENCE TO RELATED APPLICATIONS

The present application claims priority under 35 U.S.C. § 119 to Japanese Patent Application No. 2016-054450, filed Mar. 17, 2016. The contents of which are incorporated herein by reference in their entirety.

BACKGROUND OF THE INVENTION

Field of the Invention

The present disclosure relates to an ink and a method for producing the same, and an ink stored container, a printing method, and a printing apparatus.

Description of the Related Art

Compared with other printing methods, inkjet printing methods have advantages that inkjet printing methods have simple processes, can be easily accommodated to full-color operations, and can provide high-resolution images even when used on apparatuses having simple configurations. These advantages have made the inkjet printing methods popular and are spreading the inkjet printing methods to personal and office uses and commercial printing and industrial printing fields.

In the inkjet printing methods, water-based ink compositions using water-soluble dyes as coloring materials are mainly used. However, pigment inks using water-insoluble pigments are being developed to replace the water-soluble dyes, because the water-soluble dyes have disadvantages of being poor in water resistance and light resistance.

In inkjet printing in offices, plain paper is mainly used as print media, and a high image density is demanded on plain paper. Generally, when a pigment ink is printed on plain paper, the pigment does not stop at the surface of the paper but permeates the internal portion of the paper. This makes the pigment density on the surface of the paper low and makes the image density low. Increasing the pigment concentration in the ink leads to a higher image density, but also to a higher ink viscosity and a poorer discharging stability.

There is also a problem that immediately after pigment ink droplets land on plain paper, water in the ink swells the surface of the paper to generate a large difference in the stretching rate between the top and bottom surfaces, to make the paper curl. This phenomenon diminishes as the paper dries and has not been problematic in low-speed printing. However, advancement in the printing speed entails the print medium to be conveyed before the curling of the print medium after printing diminishes. This may cause a paper jam. In order to prevent this problem, there are proposed a method of adding a permeating agent in order for water to quickly permeate paper, and a method of adding a hydrophilic organic solvent in a water-based ink. However, this makes the ink hydrophobic, to make it harder to secure ink storage stability. This makes also the pigment highly permeable into the print medium, leading to a further degradation of image density.

Unlike water-based dye inks prepared by dissolving dyes in water, water-based pigment inks used in the inkjet printing methods and as writing materials need water-insoluble pigments to be dispersed in water stably for a long term. Therefore, in order to solve the problems described above, various pigment dispersants are being developed.

As a technique for improving ink storage stability, there is proposed a polymer containing, for example, a repeating unit containing an aromatic ring and a repeating unit containing an ionic group (see, e.g., Japanese Unexamined Patent Application Publication No. 2009-299005).

There is also proposed a polymer formed of a monomer containing an acidic group of carboxylic acid or sulfonic acid and a salt derivative of the acidic group and a monomer containing a partial structure derived from naphthalene (see, e.g., Japanese Unexamined Patent Application Publication No. 2007-153976).

There are also proposed techniques of using a polymer containing a specific partial structure containing naphthalene as a pigment dispersant (see, e.g., Japanese Unexamined Patent Application Publication No. 2015-117354 and U.S. Patent Application Publication No. 2016/0017075).

SUMMARY OF THE INVENTION

According to one aspect of the present disclosure, an ink contains water, a coloring material, and a copolymer.

The copolymer contains a structural unit represented by any one of general formulae (1a), (1b), and (1c) below and a structural unit containing an anionic group.

[General formula (1a)]

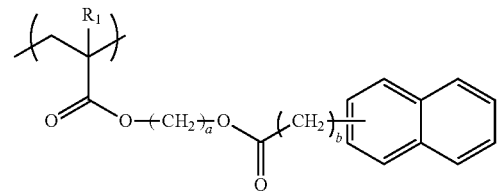

In general formula (1a), $R_1$ represents any one of a hydrogen atom and a methyl group, a represents an integer of from 6 through 10, and b represents an integer of 0 or 1.

[General formula (1b)]

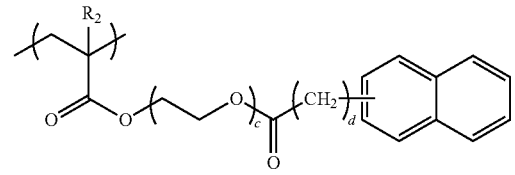

In general formula (1b), $R_2$ represents any one of a hydrogen atom and a methyl group, c represents an integer of 3 or 4, and d represents an integer of 0 or 1.

[General formula (1c)]

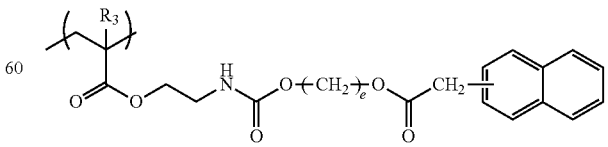

In general formula (1c), $R_3$ represents any one of a hydrogen atom and a methyl group and e represents an integer of from 2 through 10.

DESCRIPTION OF THE EMBODIMENTS (Ink)

Figure 1:
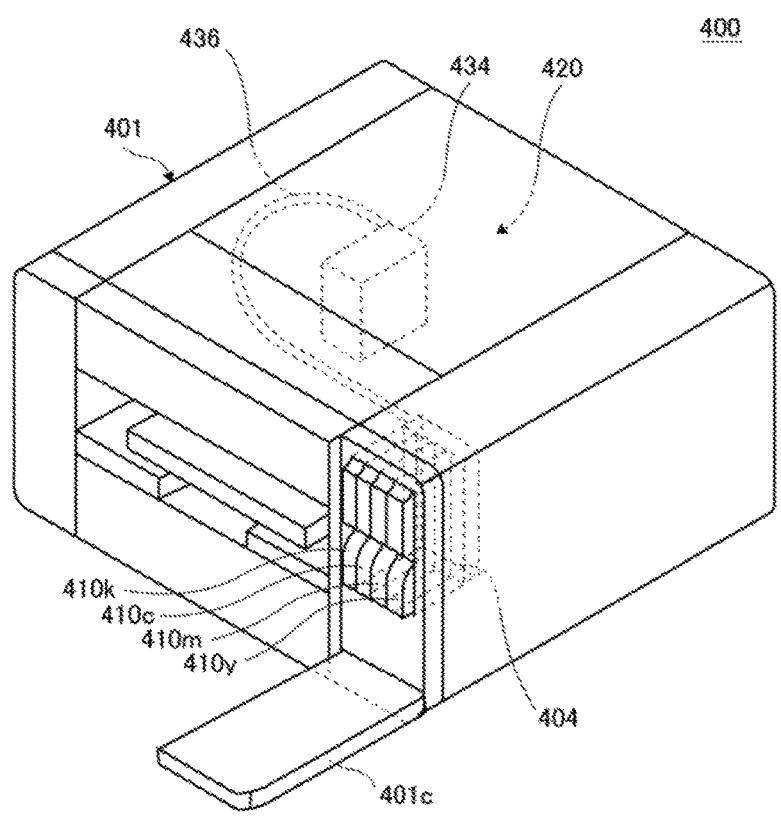
FIG. 1 is a perspective view illustrating an example of an inkjet printing apparatus.

The ink of the present disclosure contains water, a coloring material, and a copolymer containing a structural unit represented by any one of general formulae (1a), (1b), and (1c) and a structural unit containing an anionic group. The ink of the present disclosure further contains other components as needed.

A structural unit as used in the present disclosure refers to the smallest repeating unit of a polymer obtained from linking of polymerizable monomers with each other.

The ink of the present disclosure is based on a finding that the polymers described in Japanese Unexamined Patent Application Publication Nos. 2009-299005 and 2007-153976 mentioned above cannot ensure a sufficient ink storage property at higher temperature conditions.

The ink of the present disclosure is also based on a finding that the techniques of using a polymer containing a specific partial structure containing naphthalene as a pigment dispersant described in Japanese Unexamined Patent Application Publication No. 2015-117354 and U.S. Patent Application Publication No. 2016/0017075 mentioned above make discharging operations of inkjet printers unstable when the inkjet printers are released from a long term of suspension to resume printing.

Japanese Unexamined Patent Application Publication No. 2009-299005 mentioned above corresponds to Comparative Example 6 described below, Japanese Unexamined Patent Application Publication No. 2007-153976 mentioned above corresponds to Comparative Example 7 described below, Japanese Unexamined Patent Application Publication No. 2015-117354 mentioned above corresponds to Comparative Example 8 described below, and United States Patent Application Publication No. 2016/0017075 mentioned above corresponds to Comparative Example 9 described below. Even the presence of a naphthyl group at a side-chain terminal cannot make storage stability of inks sufficient depending on the structural unit containing the naphthyl group or selection of another monomer used for synthesizing a copolymer, and these inks do not have a sufficient level of discharging recoverability although these inks may not be considerably poor in qualities such as image density and ink storage stability.

The present disclosure has an object to provide an ink that can provide a high image density even when printed on plain paper and is excellent in storage stability and discharging recoverability.

The present disclosure can provide an ink that can provide a high image density even when printed on plain paper and is excellent in storage stability and discharging recoverability.

<Copolymer>

The copolymer contains a structural unit represented by any one of general formulae (1a), (1b), and (1c) below and a structural unit containing an anionic group, and further contains any other structural unit as needed.

[General formula (1a)]

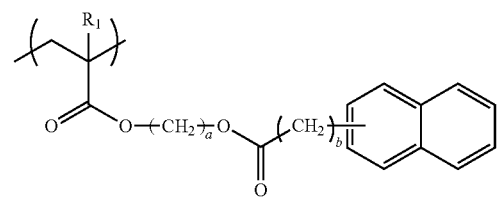

In general formula (1a), $R_1$ represents any one of a hydrogen atom and a methyl group, a represents an integer of from 6 through 10, and b represents an integer of 0 or 1.

[General formula (1b)]

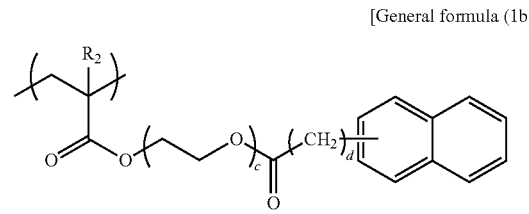

In general formula (1b), $R_2$ represents any one of a hydrogen atom and a methyl group, c represents an integer of 3 or 4, and d represents an integer of 0 or 1.

[General formula (1c)]

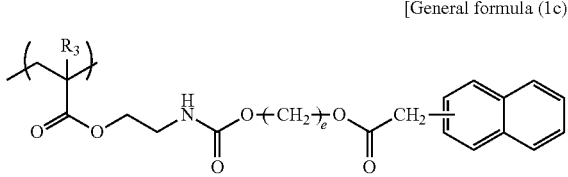

In general formula (1c), $R_3$ represents any one of a hydrogen atom and a methyl group and e represents an integer of from 2 through 10.

—Structural Unit Represented by General Formula (1a)—

In general formula (1a), $R_1$ represents any one of a hydrogen atom and a methyl group, a represents an integer of from 6 through 10, and b represents an integer of 0 or 1.

Specific examples of the structural unit represented by general formula (1a) are presented below. However, the present disclosure is not limited to the specific examples presented below.

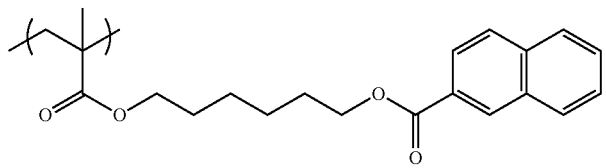

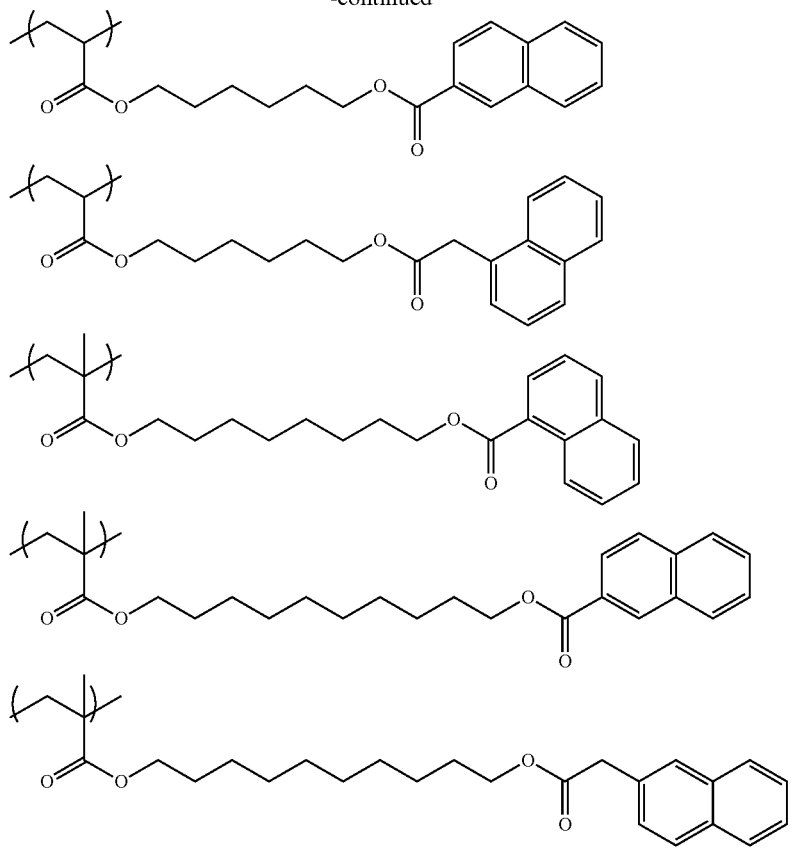

—Structural Unit Represented by General Formula (1b)—

In general formula (1b), $R_2$ represents any one of a hydrogen atom and a methyl group, c represents an integer of 3 or 4, and d represents an integer of 0 or 1.

Specific examples of the structural unit represented by general formula (1b) are presented below. However, the present disclosure is not limited to the specific examples presented below.

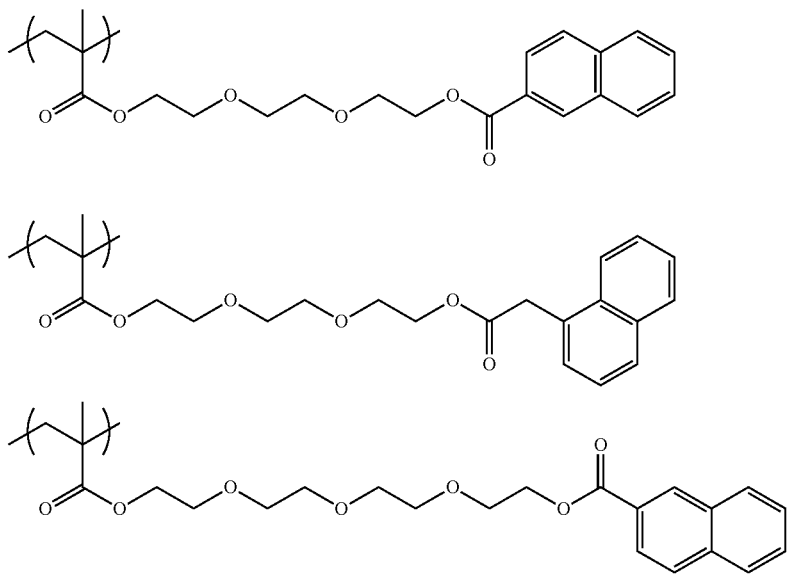

—Structural Unit Represented by General Formula (1c)—

In general formula (1c), $R_3$ represents any one of a hydrogen atom and a methyl group and e represents an integer of from 2 through 10.

Specific examples of the structural unit represented by general formula (1c) are presented below. However, the present disclosure is not limited to the specific examples presented below.

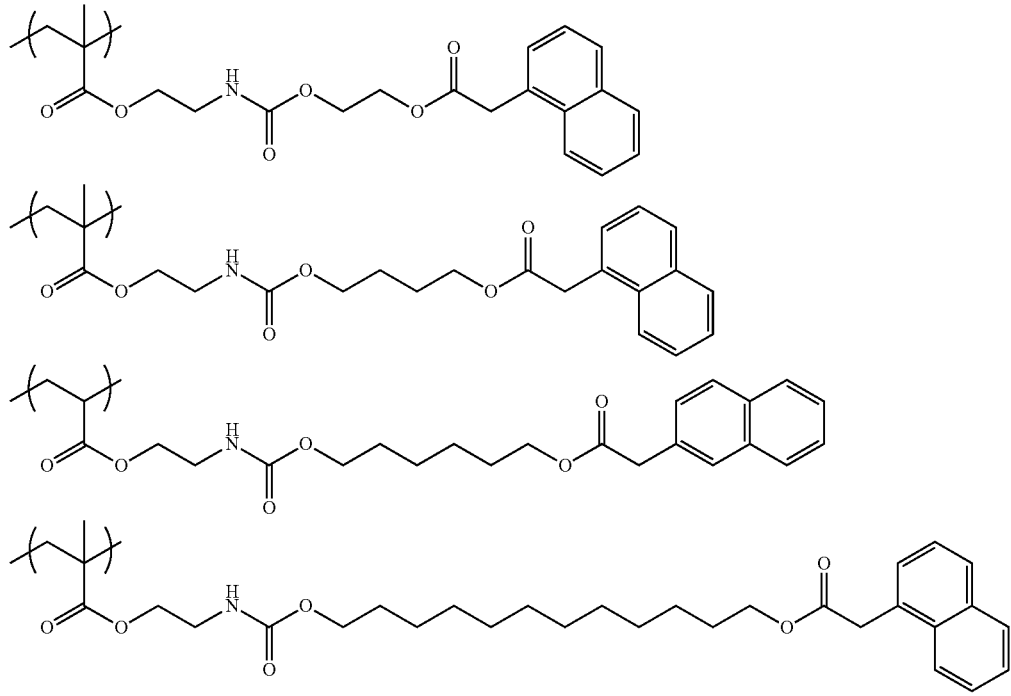

Placing a naphthyl group advantageous for pigment adsorption at a position apart from a polymer backbone provides a dispersant in which a pigment adsorbing site and an ionic site are functionally separated. This dispersant is advantageous for pigment adsorption and can provide an excellent pigment dispersibility and ink storage stability.

In the present disclosure, it is found that a naphthyl group-containing copolymer that further contains a structural unit containing an anionic group and a structural unit represented by any one of general formula (1a), general formula (1b), and general formula (1c) can provide an excellent pigment dispersibility and an excellent ink storage property and can improve discharging recoverability of a printing apparatus (inkjet printer) after a long term of suspension.

The mechanism is not clear, but is estimated as follows. The presence of the naphthyl group advantageous for pigment adsorption keeps the pigment adsorbed even when the water content evaporates to make an organic solvent rich. This is considered to improve re-dispersibility of the pigment in resumed discharging. Further, this copolymer is lower than known copolymers in interactions between adjoining structural units. This is considered to suppress aggregation and deposition of the copolymer even when the water content evaporates to increase the solid concentration of the ink, leading to an excellent discharging recoverability.

In general formula (1a) and general formula (1b), the naphthyl group is linked to the main chain skeleton in the order of an ester bond, an alkyl group, and an ester bond. This structure is considered to make interactions between the structural units low.

When a is smaller than 6 in the structural unit represented by general formula (1a), the effect of functional separation between the pigment adsorbing site and the ionic site is reduced, to degrade an ink storage property and discharging recoverability. When a is greater than 10, viscosity increase tends to occur, to degrade discharging recoverability.

When c is smaller than 3 in the structural unit represented by general formula (1b), the effect of functional separation between the pigment adsorbing site and the ionic site is reduced, to degrade an ink storage property and discharging recoverability. When c is greater than 4, viscosity increase tends to occur, to degrade discharging recoverability.

The structural unit represented by general formula (1c) contains a urethane bond that constitutes one factor of improving the force of interactions between the structural units, whereas this structural unit contains the naphthyl group bonded to an ester group via a methylene bond. This structure is considered to make interactions between the naphthyl groups low and improve discharging recoverability. When e is smaller than 2 in the structural unit represented by general formula (1c), the effect of functional separation between the pigment adsorbing site and the ionic site is reduced, to degrade an ink storage property and discharging recoverability. When e is greater than 10, viscosity increase tends to occur, to degrade discharging recoverability.

When the copolymer of the present disclosure is used in an ink, a high image density can be obtained even when the ink is printed on plain paper. The mechanism is not clear, but is estimated as follows.

That is, the ink using the copolymer of the present disclosure has a high pigment dispersion stability, and is hence considered to tend not to form coarse particles even when the ink is attached on a surface of plain paper. If coarse particles are formed, exposed portions to which the pigment is not attached are likely to be generated on the surface of the plain paper, to degrade the image density. The ink using the copolymer of the present disclosure can coat the surface of the plain paper uniformly with the pigment, to enable a high image density.

The proportion of the structural unit represented by any one of general formulae (1a), (1b), and (1c) in the copolymer is not particularly limited, may be appropriately selected depending on the intended purpose, and is preferably 60 percent by mass or greater but 90 percent by mass or less and more preferably 75 percent by mass or greater but 90 percent by mass or less of the total amount of the copolymer. When the proportion of the structural unit represented by any one of general formulae (1a), (1b), and (1c) in the copolymer is in the preferable range, there is an advantage that an ink using the copolymer can have a good image density, a good storage stability, and a good discharging recoverability.

—Structural Unit Containing Anionic Group—

The structural unit containing an anionic group is formed by copolymerization of a monomer containing an anionic group.

Examples of the monomer containing an anionic group include unsaturated carboxylic acid monomers, unsaturated sulfonic acid monomers, and unsaturated phosphoric acid monomers.

Examples of the unsaturated carboxylic acid monomers include acrylic acid, methacrylic acid, itaconic acid, maleic acid, and fumaric acid.

Examples of the unsaturated sulfonic acid monomers include styrenesulfonic acid and 2-acrylamide-2-methylpropanesulfonic acid.

Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among these monomers, monomers containing a carboxyl group is preferable in terms of storage stability, and acrylic acid or methacrylic acid is more preferable.

Specific examples of the structural unit containing an anionic group are presented below. However, the present disclosure is not limited to the specific examples presented below.

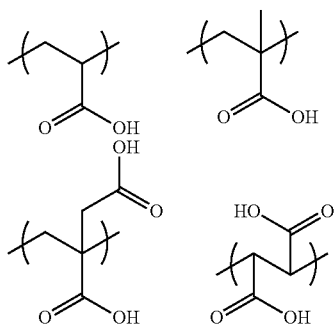

One of the monomers containing an anionic group may be used alone or two or more of the monomers containing an anionic group may be used in combination.

The structural unit containing an anionic group may be neutralized with a base.

Examples of the base include sodium hydroxide, potassium hydroxide, lithium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, triethylmethylammonium hydroxide, tributylmethylammonium hydroxide, trioctylmethylammonium hydroxide, 2-hydroxyethyltrimethylammonium hydroxide, tris(2-hydroxyethyl)methylammonium hydroxide, propyltrimethylammonium hydroxide, hexyltrimethylammonium hydroxide, octyltrimethylammonium hydroxide, nonyltrimethylammonium hydroxide, decyltrimethylammonium hydroxide, dodecyltrimethylammonium hydroxide, tetradecyltrimethylammonium hydroxide, hexadecyltrimethylammonium hydroxide, octadecyltrimethylammonium hydroxide, didodecyldimethylammonium hydroxide, ditetradecyldimethylammonium hydroxide, dihexadecyldimethylammonium hydroxide, dioctadecyldimethylammonium hydroxide, ethylhexadecyldimethylammonium hydroxide, ammonia water, dimethylamine, trimethylamine, monoethylamine, diethylamine, triethylamine, monoethanolamine, diethanolamine, triethanolamine, methylethanolamine, methyldiethanolamine, dimethylethanolamine, monopropanolamine, dipropanolamine, tripropanolamine, isopropanolamine, morpholine, N-methylmorphone, N-methyl-2-pyrolidone, and 2-pyrolidone. One of these bases may be used alone or two or more of these bases may be used in combination.

The neutralization treatment may be performed when the monomer containing an anionic group is copolymerized or when the copolymer is dissolved.

The proportion of the structural unit containing an anionic group in the copolymer is not particularly limited, may be appropriately selected depending on the intended purpose, and is preferably 10 percent by mass or greater but 40 percent by mass or less and more preferably 10 percent by mass or greater but 25 percent by mass or less of the total amount of the copolymer. When the proportion of the structural unit containing an anionic group in the copolymer is in the preferable range, there is an advantage that an ink using the copolymer can have a good image density, a good storage stability, and a good discharging recoverability.

It is preferable that the total of the proportion of the structural unit containing an anionic group and the proportion of the structural unit represented by any one of general formulae (1a), (1b), and (1c) in the copolymer be 90 percent by mass or greater. When the total of the proportions is in the preferable range, it is easier for the effect of functional separation between the pigment adsorbing group and the ionic group to be expressed. This is advantageous because an ink using the copolymer can have a good image density, a good storage stability, and a good discharging recoverability.

—Any Other Structural Unit—

In the present disclosure, the copolymer may contain a structural unit formed of any other polymerizable monomer, in addition to the structural unit represented by any one of general formulae (1a), (1b), and (1c) and the structural unit containing an anionic group.

The any other polymerizable monomer is not particularly limited and may be appropriately selected depending on the intended purpose. Examples of the any other polymerizable monomer include polymerizable hydrophobic monomers, polymerizable hydrophilic monomers, and polymerizable surfactants.

Examples of the polymerizable hydrophobic monomers include: unsaturated ethylene monomers containing an aromatic ring, such as styrene, α-methylstyrene, 4-t-butylstyrene, and 4-chloromethylstyrene; alkyl (meth)acrylates such as methyl (meth)acrylate, ethyl (meth)acrylate, (meth)acrylic acid-n-butyl, dimethyl maleate, dimethyl itaconate, dimethyl fumarate, lauryl (C12) (meth)acrylate, tridecyl (C13) (meth)acrylate, tetradecyl (C14) (meth)acrylate, pentadecyl (C15) (meth)acrylate, hexadecyl (C16) (meth)acrylate, heptadecyl (C17) (meth)acrylate, nonadecyl (C19) (meth)acrylate, eicosyl (C20) (meth)acrylate, heneicosyl (C21) (meth)acrylate, and docosyl (C22) (meth)acrylate; and unsaturated ethylene monomers containing an alkyl group, such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene. One of these polymerizable hydrophobic monomers may be used alone or two or more of these polymerizable hydrophobic monomers may be used in combination.

Examples of the polymerizable hydrophilic monomers include nonionic unsaturated ethylene monomers such as (meth)acrylic acid-2-hydroxyethyl, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinylformamide, N-vinylacetamide, N-vinylpyrrolidone, acrylamide, N,N-dimethylacrylamide, N-t-butylacrylamide, N-octylacrylamide, and N-t-octylacrylamide.

A polystyrene-equivalent weight average molecular weight of the copolymer is preferably 5,000 or greater but 40,000 or less. When the weight average molecular weight of the copolymer is in the preferable range, there is an advantage that an ink using the copolymer can have a good image density, a good storage stability, and a good discharging recoverability.

It is possible to analyze the structure of the copolymer by common analyzing methods such as NMR and IR.

<Synthesis of Copolymer>

The copolymer of the present disclosure is synthesized by radical polymerization of polymerizable materials including a monomer represented by any one of general formulae (2a), (2b), and (2c) below and a monomer containing an anionic group.

—Monomer Represented by General Formula (2a)—

In general formula (2a), $R_1$ represents any one of a hydrogen atom and a methyl group, a represents an integer of from 6 through 10, and b represents an integer of 0 or 1.

Specific examples of the monomer represented by general formula (2a) are presented below. However, the present disclosure is not limited to the specific examples presented below.

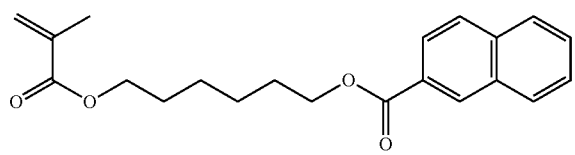

[M-a1]

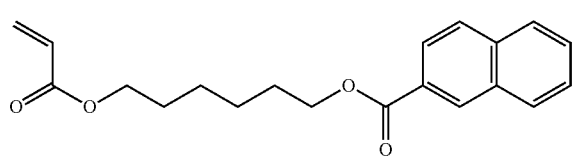

[M-a2]

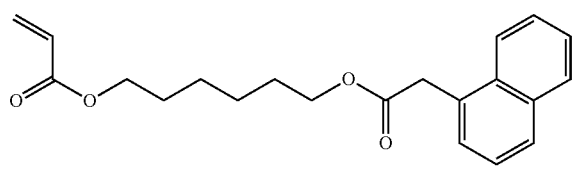

[M-a3]

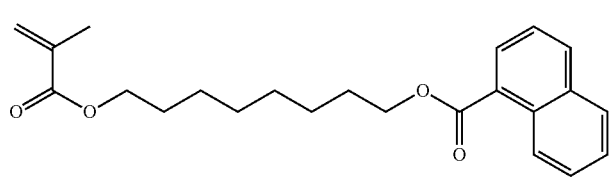

[M-a4]

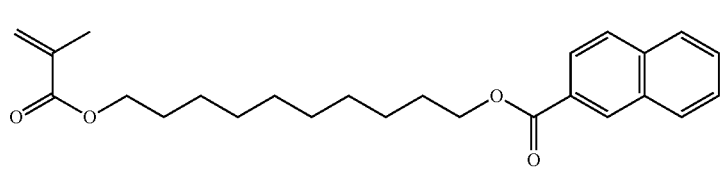

[M-a5]

[M-a6]

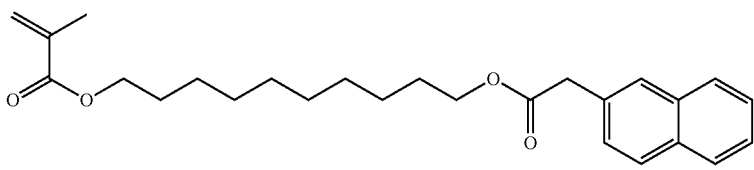

The monomer represented by general formula (2a) can be synthesized in the manner described below and used.

First, as presented by reaction formula (1) below, a diol compound (R-1) a naphthalene derivative (R-2) containing a carboxyl group are allowed to undergo a reaction in the presence of an acid catalyst, to obtain an intermediate reaction product (R-3).

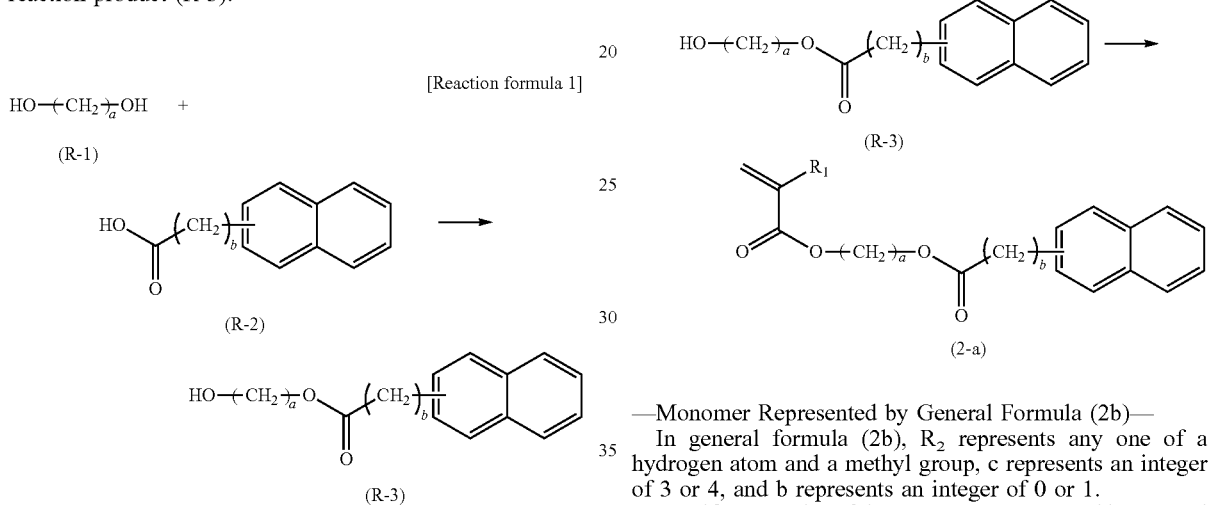

In another method, as presented by reaction formula (2) below, an acid chloride (R-4) of a naphthalene derivative containing a carboxyl group and a diol compound (R-1) are allowed to undergo a reaction in the presence of an acid receptor such as amine or pyridine. This method can also provide the intermediate reaction product (R-3).

Next, as presented by reaction formula (3) below, a (meth)acrylic acid chloride (R-5) and (R-3) described above are allowed to undergo a reaction, to obtain the monomer represented by general formula (2a).

—Monomer Represented by General Formula (2b)—

In general formula (2b), $R_2$ represents any one of a hydrogen atom and a methyl group, c represents an integer of 3 or 4, and b represents an integer of 0 or 1.

Specific examples of the monomer represented by general formula (2b) are presented below. However, the present disclosure is not limited to the specific examples presented below.

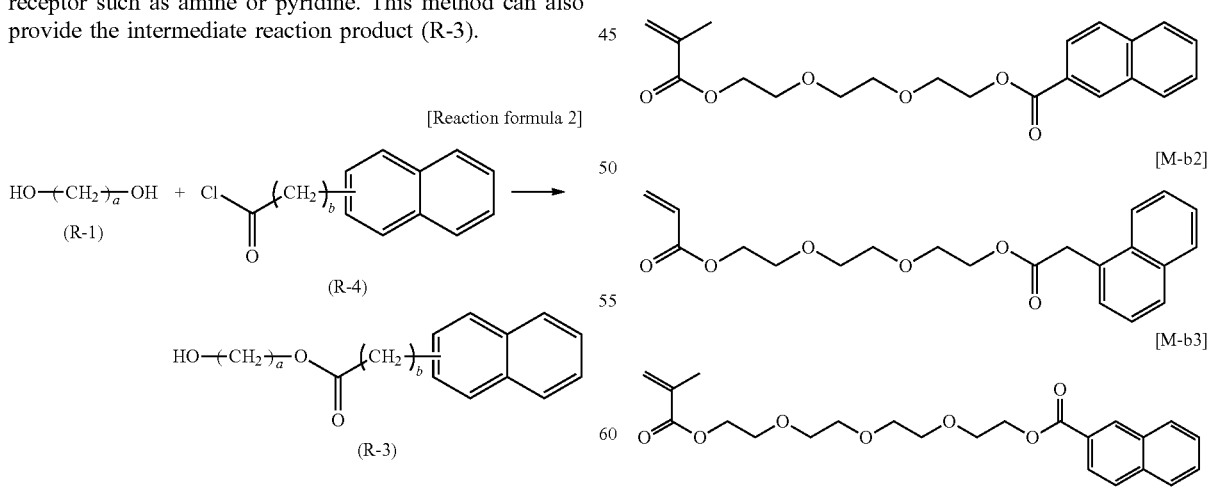

The monomer represented by general formula (2b) can be synthesized in the manner described below and used.

First, as presented by reaction formula (4) below, an ethylene glycol condensate (R-6) and a naphthalene derivative (R-7) containing a carboxyl group are allowed to undergo a reaction in the presence of an acid catalyst, to obtain an intermediate reaction product (R-8).

[Reaction formula 4]

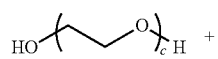
(R-6)

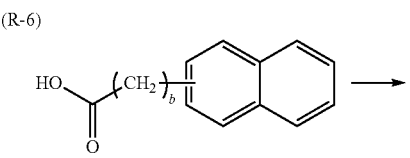
(R-7)

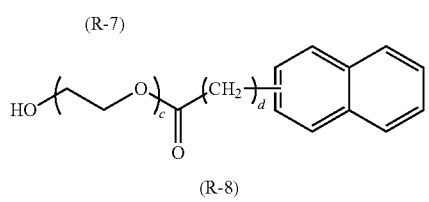
(R-8)

In another method, as presented by reaction formula (5) below, an acid chloride (R-9) of a naphthalene derivative containing a carboxyl group and an ethylene glycol condensate (R-6) are allowed to undergo a reaction in the presence of an acid receptor such as amine or pyridine. This method can also provide the intermediate reaction product (R-8).

[Reaction formula 5]

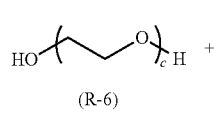
(R-6)

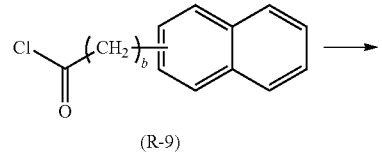
(R-9)

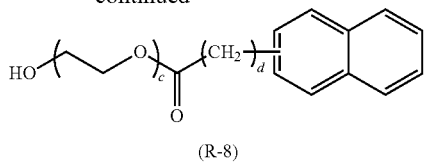
(R-8)

Next, as presented by reaction formula (6) below, (meth) acrylic acid chloride (R-10) and (R-8) described above are allowed to undergo a reaction, to obtain the monomer represented by general formula (2b).

[Reaction formula 6]

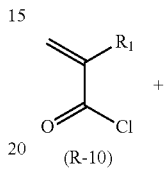
(R-10)

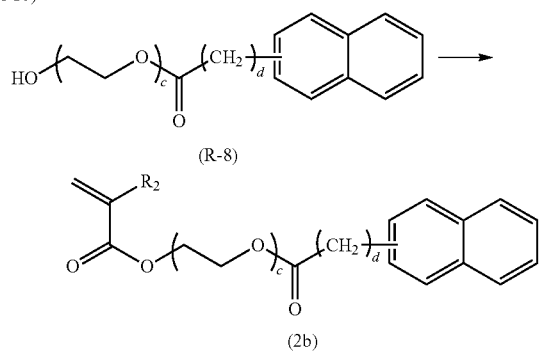
(R-8)

(2b)

—Monomer Represented by General Formula (2c)—

In general formula (2c), $R_3$ represents any one of a hydrogen atom and a methyl group and e represents an integer of from 2 through 10.

Specific examples of the monomer represented by general formula (2c) are presented below. However, the present disclosure is not limited to the specific examples presented below.

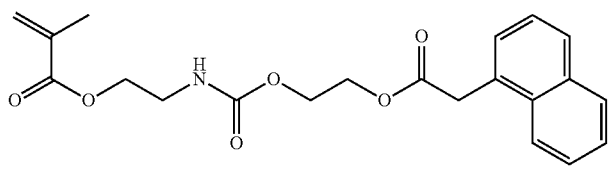
[M-c1]

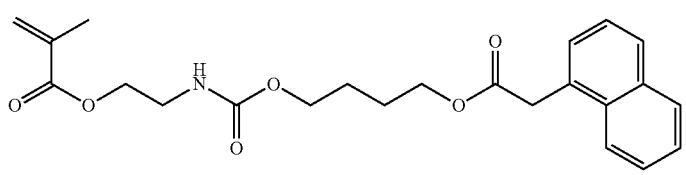
[M-c2]

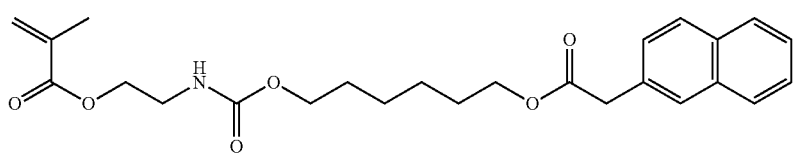
[M-c3]

-continued

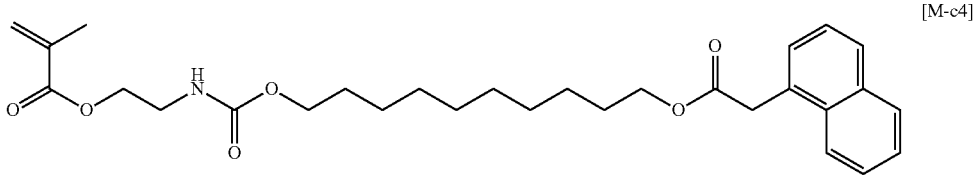

[M-c4]

The monomer represented by general formula (2c) can be synthesized in the manner described below and used.

First, as presented by reaction formula (7) below, a diol compound (R-11) and naphthaleneacetic acid (R-12) are allowed to undergo a reaction in the presence of an acid catalyst, to obtain an intermediate reaction product (R-13).

[Reaction formula 7]

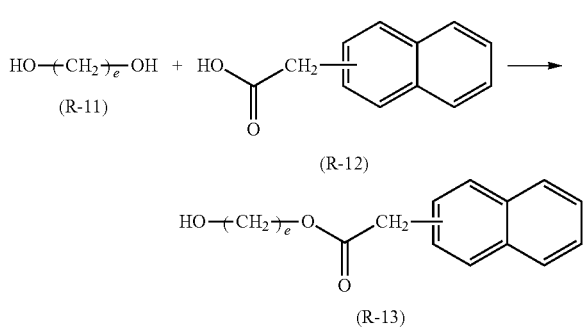

Next, as presented by reaction formula (8) below, 2-isocyanatoethyl (meth)acrylate (R-14) and (R-13) described above are allowed to undergo a reaction, to obtain the monomer represented by general formula (2c).

[Reaction formula 8]

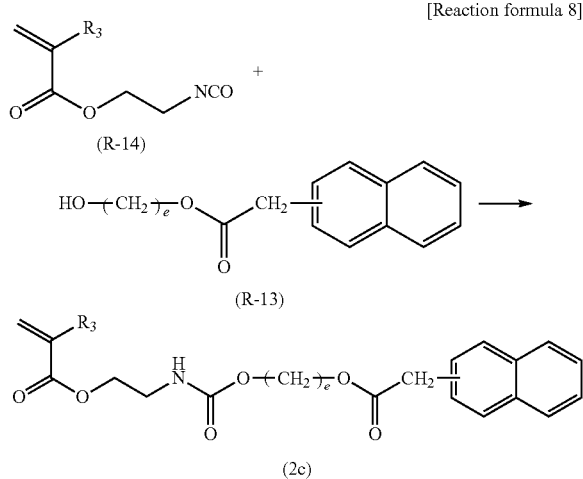

As the method for synthesizing the copolymer of the present disclosure, methods using radical polymerization initiators are preferable because it is easy to adjust the polymerization operation and the molecular weight with such methods. A solution polymerization method for allowing a polymerization reaction to occur in a solution is more preferable.

Examples of a preferable solvent for radical polymerization by the solution polymerization method include ketone-based solvents such as acetone, methyl ethyl ketone, and methyl isobutyl ketone, acetic acid ester-based solvents such as ethyl acetate and butyl acetate, aromatic hydrocarbon-based solvents such as benzene, toluene, and xylene, isopropanol, ethanol, cyclohexane, tetrahydrofuran, dimethylformamide, dimethylsulfoxide, and hexamethyl phosphoamide. Among these solvents, ketone-based solvents, acetic acid ester-based solvents, and alcohol-based solvents are preferable.

The radical polymerization initiator is not particularly limited and may be appropriately selected depending on the intended purpose. Examples of the radical polymerization initiator include peroxyketal, hydroperoxide, dialkyl peroxide, diacyl peroxide, peroxydicarbonate, peroxyester, cyano-based azobisisobutyronitrile, azobis(2-methylbutyronitrile), azobis(2,2'-isovaleronitrile), and non-cyano-based dimethyl-2,2'-azobisisobutyrate. One of these radical polymerization initiators may be used alone or two or more of these radical polymerization initiators may be used in combination. Among these radical polymerization initiators, organic peroxides and azo-based compounds are preferable because molecular weight control is easy and a decomposition temperature is low with these radical polymerization initiators. Azo-based compounds are particularly preferable.

The proportion of the radical polymerization initiator is not particularly limited, may be appropriately selected depending on the intended purpose, and is preferably 1 percent by mass or greater but 10 percent by mass or less of the total amount of the polymerizable monomers.

In order to adjust the molecular weight of the polymer, it is possible to add a chain transfer agent in an appropriate amount.

Examples of the chain transfer agent include mercaptoacetic acid, mercaptopropionic acid, 2-propanethiol, 2-mercaptoethanol, thiophenol, dodecylmercaptan, 1-dodecanethiol, and thioglycerol.

The polymerization temperature is not particularly limited, may be appropriately selected depending on the intended purpose, and is preferably 50 degrees C. or higher but 150 degrees C. or lower and more preferably 60 degrees C. or higher but 100 degrees C. or lower. The polymerization time is not particularly limited, may be appropriately selected depending on the intended purpose, and is preferably 3 hours or longer but 48 hours or shorter.

The proportion of the copolymer of the present disclosure in the ink is not particularly limited, may be appropriately selected depending on the intended purpose, and is preferably 0.05 percent by mass or greater but 10 percent by mass or less and more preferably 0.3 percent by mass or greater but 5 percent by mass or less on a solid content basis.

When the proportion of the copolymer is 0.05 percent by mass or greater, the copolymer expresses an effect of improving dispersibility and a storage property. When the proportion of the copolymer is 10 percent by mass or less, the viscosity of the ink can be adjusted to a range suitable for the ink to be discharged from a head.

The copolymer of the present disclosure is not particularly limited and may be used as a dispersant for a pigment or an additive to be added to a pigment dispersion. When the copolymer is used as a dispersant for a pigment, the copolymer can provide a greater improvement in storage stability of an ink in which a water-soluble organic solvent proportion is high.

The proportion of the copolymer of the present disclosure is not particularly limited and may be appropriately selected depending on the intended purpose when the copolymer is used as a pigment dispersant. The proportion of the copolymer is preferably 1 part by mass or greater but 100 parts by mass or less and more preferably 5 parts by mass or greater but 80 parts by mass or less relative to 100 parts by mass of the pigment. When the proportion of the copolymer is in the more preferable range, there is an advantage that a good image density and a good storage stability can be obtained.

<Water>

The water may be pure water such as ion-exchanged water, ultrafiltrated water, reverse osmotic water, and distilled water or may be ultrapure water.

The proportion of the water in the ink is not particularly limited, may be appropriately selected depending on the intended purpose, and is preferably 10 percent by mass or greater but 90 percent by mass or less and more preferably 20 percent by mass or greater but 60 percent by mass or less in terms of a drying property and discharging reliability of the ink.

<Coloring Material>

The coloring material may be a pigment or a dye. A pigment is preferable because the coloring material adsorbing ability of the copolymer is better to a pigment than to a dye, and in terms of water resistance and light resistance.

The pigment is not particularly limited and may be appropriately selected depending on the intended purpose. Examples of the pigment include inorganic pigments and organic pigments for black or colors. One of these pigments may be used alone or two or more of these pigments may be used in combination.

Examples of the inorganic pigments include titanium oxide, iron oxide, calcium carbonate, barium sulfate, aluminum hydroxide, barium yellow, cadmium red, and chrome yellow, and in addition, carbon black produced by known methods such as contact methods, furnace methods, and thermal methods.

Examples of pigments for black include carbon blacks (C.I. pigment black 7) such as furnace black, lamp black, acetylene black, and channel black, metals such as copper and iron (C.I. pigment black 11), metal oxides such as titanium oxide, and organic pigments such as aniline black (C.I. pigment black 1).

A preferable carbon black is carbon black produced by a furnace method or a channel method and having a primary particle diameter of 15 nm or greater but 40 nm or less, a BET specific surface area of 50 $m^2$/g or greater but 300 $m^2$/g or less, a DBP oil absorption of 40 mL/100 g or greater but 150 mL/100 g or less, a volatile proportion of 0.5 percent or greater but 10 percent or less, and pH of 2 or higher but 9 or lower.

Examples of the organic pigments include azo-pigments (e.g., azo lake, insoluble azo-pigments, condensed azo-pigments, and chelate azo-pigments), polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye chelates and acid dye chelates), nitro pigments, nitroso pigments, and aniline black.

Among these pigments, pigments having a good affinity with water are particularly preferable.

Examples of the azo-pigments include azo lake, insoluble azo-pigments, condensed azo-pigments, and chelate azo-pigments.

Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, quinophthalone pigments, and rhodamine B lake pigments.

Examples of the dye chelates include basic dye chelates and acid dye chelates.

A pigment for yellow is not particularly limited and may be appropriately selected depending on the intended purpose. Examples of the pigment for yellow include C.I. pigment yellow 1, C.I. pigment yellow 2, C.I. pigment yellow 3, C.I. pigment yellow 12, C.I. pigment yellow 13, C.I. pigment yellow 14, C.I. pigment yellow 16, C.I. pigment yellow 17, C.I. pigment yellow 73, C.I. pigment yellow 74, C.I. pigment yellow 75, C.I. pigment yellow 83, C.I. pigment yellow 93, C.I. pigment yellow 95, C.I. pigment yellow 97, C.I. pigment yellow 98, C.I. pigment yellow 114, C.I. pigment yellow 120, C.I. pigment yellow 128, C.I. pigment yellow 129, C.I. pigment yellow 138, C.I. pigment yellow 150, C.I. pigment yellow 151, C.I. pigment yellow 154, C.I. pigment yellow 155, C.I. pigment yellow 174, and C.I. pigment yellow 180.

A pigment for magenta is not particularly limited and may be appropriately selected depending on the intended purpose. Examples the pigment for magenta include C.I. pigment red 5, C.I. pigment red 7, C.I. pigment red 12, C.I. pigment red 48 (Ca), C.I. pigment red 48 (Mn), C.I. pigment red 57 (Ca), C.I. pigment red 57:1, C.I. pigment red 112, C.I. pigment red 122, C.I. pigment red 123, C.I. pigment red 146, C.I. pigment red 168, C.I. pigment red 176, C.I. pigment red 184, C.I. pigment red 185, C.I. pigment red 202, and pigment violet 19.

A pigment for cyan is not particularly limited and may be appropriately selected depending on the intended purpose. Examples of the pigment for cyan include: C.I. pigment blue 1, C.I. pigment blue 2, C.I. pigment blue 3, C.I. pigment blue 15, C.I. pigment blue 15:3, C.I. pigment blue 15:4, C.I. pigment blue 15:34, C.I. pigment blue 16, C.I. pigment blue 22, C.I. pigment blue 60, C.I. pigment blue 63, and C.I. pigment blue 66; and C.I. vat blue 4 and C.I. vat blue 60.

Use of C.I. pigment yellow 74 as the yellow pigment, C.I. pigment red 122 and C.I. pigment violet 19 as the magenta pigment, and C.I. pigment blue 15:3 as the cyan pigment can provide a well-balanced ink excellent in color tone and light resistance.

The ink of the present disclosure can also use a coloring material newly produced for the present disclosure.

A self-dispersing pigment may be used in terms of chromogenicity of an image to be obtained. An anionic self-dispersing pigment is preferable. The anionic self-dispersing pigment refers to a pigment that is made stably dispersible by introduction of an anionic functional group to the surface of the pigment directly or via a group of any other atoms.

Various known pigments such as pigments listed in International Publication No. WO 2009/014242 may be used as the pigment before made stably dispersible.

The anionic functional group refers to a functional group from which a half or more of hydrogen ions dissociate at pH of 7.0. Specific examples of the anionic functional group include a carboxyl group, a sulfo group, and a phosphonic acid group. Among these anionic functional groups, a carboxyl group or a phosphonic acid group is preferable in terms of enhancing the optical density of an image to be obtained.

Examples of the method for introducing an anionic functional group to the surface of a pigment include a method of applying an oxidation treatment to carbon black.

Specific examples of the oxidation treatment method include a treatment method using hypochlorite, ozone water, hydrogen peroxide, chlorite, or nitric acid, and surface treatment methods using a diazonium salt described in Japanese Patent No. 3808504 and Japanese Translation of PCT International Application Publication Nos. 2009-515007 and 2009-506196.

Examples of commercially available pigments having a hydrophilic functional group introduced to the surface include: CW-1, CW-2, and CW-3 (all available from Orient Chemical Industries Co., Ltd.); and CAB-O-JET200, CAB-O-JET300, and CAB-O-JET400 (all available from Cabot Corporation).

The proportion of the pigment in the ink is not particularly limited, may be appropriately selected depending on the intended purpose, and is preferably 0.5 percent by mass or greater but 20 percent by mass or less and more preferably 1 percent by mass or greater but 10 percent by mass or less.

As the dye, dyes classified as acid dyes, direct dyes, basic dyes, reactive dyes, and food dyes in the color index may be used.

Examples of the acid dyes and food dyes include C.I. acid black 1, 2, 7, 24, 26, and 94, C.I. acid yellow 17, 23, 42, 44, 79, and 142, C.I. acid blue 9, 29, 45, 92, and 249, C.I. acid red 1, 8, 13, 14, 18, 26, 27, 35, 37, 42, 52, 82, 87, 89, 92, 97, 106, 111, 114, 115, 134, 186, 249, 254, and 289, C.I. food black 1 and 2, C.I. food yellow 3 and 4, and C.I. food red 7, 9, and 14.

Examples of the direct dyes include C.I. direct black 19, 22, 32, 38, 51, 56, 71, 74, 75, 77, 154, (168), and 171, C.I. direct yellow 1, 12, 24, 26, 33, 44, 50, 86, 120, 132, 142, and 144. C.I. direct blue 1, 2, 6, 15, 22, 25, 71, 76, 79, 86, 87, 90, 98, 163, 165, 199, and 202, C.I. direct red 1, 4, 9, 13, 17, 20, 28, 31, 39, 80, 81, 83, 89, 225, and 227, and C.I. direct orange 26, 29, 62, and 102.

Examples of the basic dyes include C.I. basic black 2 and 8, C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112.

Examples of the reactive dyes include C.I. reactive black 3, 4, 7, 11, 12, and 17, C.I. reactive yellow 1, 5, 11, 13, 14, 20, 21, 22, 25, 40, 47, 51, 56, 65, and 67, C.I. reactive blue 1, 2, 7, 14, 15, 23, 32, 35, 38, 41, 63, 80, and 95, and C.I. reactive red 1, 14, 17, 25, 26, 32, 37, 44, 46, 55, 60, 66, 74, 79, 96, and 97.

It is preferable that the ink of the present disclosure contain an organic solvent in order to enhance permeability into plain paper and coat paper, suppress occurrence of beading, and prevent drying of the ink utilizing the humectant effect of the organic solvent.
<Organic Solvent>

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent in ink has no particular limit and can be suitably selected to suit a particular application. In terms of the drying property and discharging reliability of the ink, the proportion is preferably from 10 through 60 percent by mass and more preferably from 20 through 60 percent by mass.

It is preferable that the ink of the present disclosure contain a surfactant in order to enhance permeability and wettability into plain paper and coat paper and suppress occurrence of beading.
<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Among silicone-based surfactants, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluoro surfactants are particularly preferable because these fluoro surfactants do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates. These surfactants can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-based surfactant has no particular limit and can be suitably selected to suit to a particular application. Examples thereof include a compound in which the polyalkylene oxide structure represented by the following general formula S-1 is introduced into the side chain of the Si site of dimethyl polysiloxane.

General formula S-1

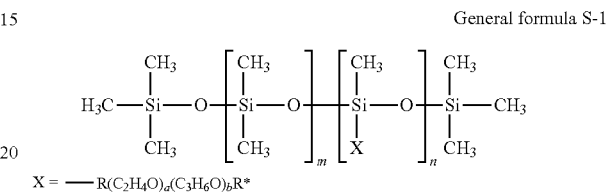

$X = \text{---} R(C_2H_4O)_a(C_3H_6O)_bR^*$

In general formula S-1, "m", "n", "a", and "b" each, respectively represent integers, R represents an alkylene group, and R' represents an alkyl group.

Products available on the market may be used as the polyether-modified silicone-based surfactants. Specific examples of the products available on the market include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440, TSF4452, and TSF4453 (all manufactured by Toshiba Silicone Co., Ltd.).

A fluorosurfactant in which the number of carbon atoms replaced with fluorine atoms is from 2 through 16 and more preferably from 4 through 16 is preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these fluorosurfactants, polyoxyalkylene ether polymer compounds having a perfluoroalkyl ether group in its side chain are preferable because these compounds do not foam easily and the fluorosurfactant represented by the following general formula F-1 or general formula F-2 is particularly preferable.

$CF_3CF_2(CF_2CF_2)_m\text{---}CH_2CH_2O(CH_2CH_2O)_nH$    General formula F-1

In general formula F-1, "m" is preferably an integer of from 0 through 10 and "n" is preferably an integer of from 0 through 40 in order to provide water solubility.

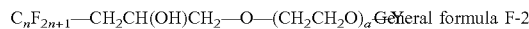

$C_nF_{2n+1}\text{---}CH_2CH(OH)CH_2\text{---}O\text{---}(CH_2CH_2O)_aY$    General formula F-2

In general formula F-2, Y represents H, $C_nF_{2n+1}$, where "n" is an integer of from 1 through 6, $CH_2CH(OH)CH_2\text{---}C_nF_{2n+1}$, where n represents an integer of from 4 through 6, or $C_pH_{2p+1}$, where p represents an integer of from 1 through 19. "a" represents an integer of from 4 through 14.

Products available on the market may be used as the fluorosurfactant.

Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFAC F-470, F-1405, and F-474 (all manufactured by DIC CORPORATION); ZONYL™ TBS, FSP, FSA, FSN-100, FSN, FSO-100, FSO, FS-300, and UR (all manufactured by Du Pont Kabushiki Kaisha), FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these products, FS-300 (manufactured by Du Pont Kabushiki Kaisha), FT-110, FT-250, FT-251, FT-400S, FT-150, and FT-400SW (all manufactured by NEOS COMPANY LIMITED), POLYYOX PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dyeing property to paper.

The proportion of the surfactant in ink is not particularly limited and can be suitably selected to suit to a particular application. It is preferably from 0.001 through 5 percent by mass and more preferably from 0.05 through 5 percent by mass in terms of excellent wettability and discharging stability and improvement on image quality.

It is preferable that the ink of the present disclosure contain, for example, a preservative and fungicide, a corrosion inhibitor, and a pH regulator as needed as the other components.

<Preservative and Fungicide>

The preservatives and fungicides are not particularly limited. A specific example is 1,2-benzisothiazolin-3-on.

<Corrosion Inhibitor>

The corrosion inhibitor has no particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25 degrees C. is preferably from 5 through 30 mPa·s and more preferably from 5 through 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 through 12 and more preferably from 8 through 11 in terms of prevention of corrosion of metal materials contacting the ink.

(Method for Producing Ink)

The method for producing an ink of the present disclosure is a method for producing an ink containing water, a coloring material, and a copolymer, and includes a step of synthesizing a copolymer, and further includes other steps as needed.

The step of synthesizing a copolymer is the same as the method for synthesizing the copolymer described above.

Examples of the other steps include a mixing step.

The mixing step is a step of dispersing or dissolving the water, the coloring material, the copolymer, and the other components and stirring and mixing these materials.

The copolymer may be used as a pigment dispersant resin in production of a pigment dispersion.

The dispersing can be performed by, for example, a sand mill, a homogenizer, a ball mill, a paint shaker, or ultrasonic dispersion. The stirring and mixing can be performed by, for example, a stirrer using a typical stirring blade, a magnetic stirrer, and a high-speed disperser.

<Print Medium>

The print medium for use in printing is not particularly limited. Specific examples thereof include, but are not limited to, plain paper, gloss paper, special paper, cloth, film, OHP sheets, printing paper for general purpose.

<Printed Matter>

The printed matter of the present disclosure includes a print medium and an image formed on the print medium with the ink of the present disclosure.

An inkjet printing device and an inkjet printing method are used to print the image on the print medium to obtain the printed matter.

(Ink Stored Container)

The ink stored container of the present disclosure is an ink stored container including an ink accommodating unit configured to store an ink. The ink stored in the ink accommodating unit is the ink of the present disclosure. The container stores the ink, and further includes other members appropriately selected as needed.

The container is not particularly limited, and the shape, structure, size, material, etc. of the container may be appropriately selected depending on the intended purpose. Preferable examples of the container include a container including at least an ink accommodating unit formed of, for example, aluminum laminate film or resin film.

<Printing Apparatus and Printing Method>

The ink of the present disclosure can be suitably applied to various printing apparatuses employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing apparatus and the printing method represent an apparatus capable of discharging ink, various processing fluids, etc. to a print medium and a method printing an image on the print medium using the apparatus. The print medium means an article to which the ink or the various processing fluids can be attached at least temporarily.

The printing apparatus may further optionally include a device relating to feeding, conveying, and ejecting the print medium and other devices referred to as a pre-processing device, a post-processing device, etc. in addition to the head portion to discharge the ink.

The printing apparatus and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing apparatus and the printing method are not limited to those producing merely meaningful visible images such as texts and figures with the ink. For example, the printing apparatus and the printing method can produce patterns like geometric design and 3D images.

In addition, the printing apparatus includes both a serial type apparatus in which the liquid discharging head is caused to move and a line type apparatus in which the liquid discharging head is not moved, unless otherwise specified.

Furthermore, in addition to the desktop type, this printing apparatus includes a wide type capable of printing images on a large print medium such as A0, and a continuous printer capable of using continuous paper wound up in a roll form as print media.

Figure 2:
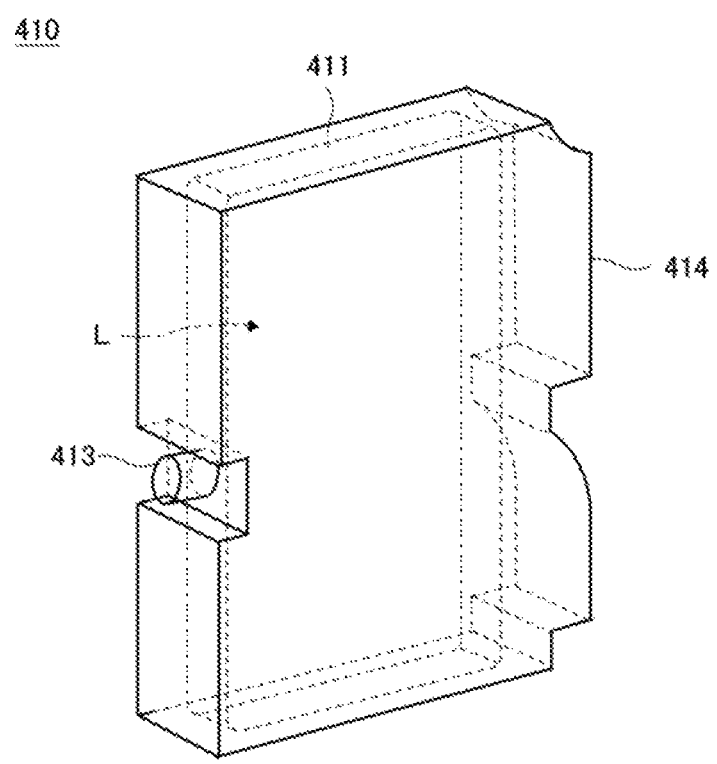
FIG. 2 is a perspective view illustrating an example of a main tank of an inkjet printing apparatus.

The printing apparatus of the present disclosure is described using an example with reference to FIG. 1 and FIG. 2. FIG. 1 is a perspective view illustrating the image printing apparatus. FIG. 2 is a perspective view illustrating the main tank. An image forming apparatus 400 as an example of the printing apparatus is a serial type image forming apparatus. A mechanical unit 420 is disposed in an exterior 401 of the image forming apparatus 400. Each ink accommodating unit 411 of each main tank 410 (410k, 410c, 410m, and 410y) for each color of black (K), cyan (C), magenta (M), and yellow (Y) is made of a packing member such as aluminum laminate film. The ink accommodating unit 411 is accommodated in a plastic housing unit 414. As a result, the main tank 410 is used as an ink cartridge of each color.

A cartridge holder 404 is disposed on the rear side of the opening when a cover 401c of the main body of the apparatus is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink storing unit, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

EXAMPLES

Examples of the present disclosure will be described below. However, the present disclosure should not be construed as being limited to the Examples.

Average molecular weights of copolymers used in Examples and Comparative Examples were obtained in the manner described below.

<Measurement of Average Molecular Weight of Copolymer>

Gel permeation chromatography (GPC) measurement was performed under the conditions presented below.

Instrument: GPC-8020 (available from Tosoh Corporation)
Columns: TSK G2000HXL and G4000HXL (available from Tosoh Corporation)
Temperature: 40 degrees C.
Solvent: tetrahydrofuran (THF)
Flow rate: 1.0 mL/minute A copolymer having a concentration of 0.5 percent by mass (1 mL) was injected and measured under the conditions presented above, to obtain a molecular weight distribution of the copolymer. Based on this molecular weight distribution, a weight average molecular weight Mw and a number average molecular weight Mn of the copolymer were calculated using a molecular weight calibration curve generated based on monodisperse polystyrene standard samples.

(Monomer Synthesis Example 1)
—Synthesis of Monomer M-a1—

1,6-Hexanediol (available from Tokyo Chemical Industry Co., Ltd.) (62.0 g) (525 mmol) was dissolved in methylene chloride (700 mL). To the resultant, pyridine (20.7 g) (262 mmol) was added.

To this solution, a solution obtained by dissolving 2-naphthalene carbonyl chloride (available from Tokyo Chemical Industry Co., Ltd.) (50.0 g) (262 mmol) in methylene chloride (100 mL) was dropped for 2 hours under stirring. Subsequently, the resultant was stirred at room temperature for 6 hours. The obtained reaction solution was washed with water. An organic phase was isolated from the resultant and dried with magnesium sulfate to evaporate the solvent. The residue was refined by silica gel column chromatography using a methylene chloride/methanol (at a volume ratio of 98/2) mixture solvent as an eluent, to obtain an intermediate reaction product represented by structural formula (I-1) below (52.5 g).

[Structural formula (I-1)]

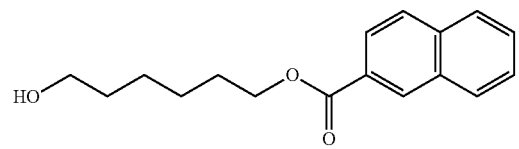

Next, the intermediate reaction product represented by structural formula (I-1) (41.0 g) (151 mmol) was dissolved in methylene chloride (250 mL). To the resultant, triethylamine (available from Tokyo Chemical Industry Co., Ltd.) (20.0 g) (198 mmol) was added. The resultant solution was cooled in an ice bath. Methacrylic acid chloride (available from Tokyo Chemical Industry Co., Ltd.) (20.0 g) (191 mmol) was dropped into the solution for 30 minutes. Subsequently, the resultant was stirred in an ice bath for 1 hour and stirred at room temperature for 3 hours. A resultant precipitate was filtered out. The filtrate was washed with water, a saturated sodium hydrogen carbonate aqueous solution, and a saturated saline solution. An organic phase was isolated from the resultant and dried with magnesium sulfate to evaporate the solvent. The residue was refined by silica gel column chromatography using an n-hexane/ethyl acetate (at a volume ratio of 6/1) mixture solvent as an eluent, to obtain a monomer M-a1 (39.4 g).

[Monomer M-a1]

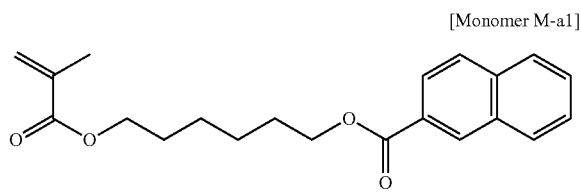 [SMILES: C=C(C)C(=O)OCCCCCCOC(=O)c1ccc2ccccc2c1]

(Monomer Synthesis Example 2)
—Synthesis of Monomer M-a3—

1,6-Hexanediol (150.0 g) (1.26 mol) and 1-naphthaleneacetic acid (available from Tokyo Chemical Industry Co., Ltd.) (50.0 g) (0.268 mol) were put in a reaction vessel and heated to 70 degrees C. under stirring, to be dissolved. To the resultant, concentrated sulfuric acid (1.30 g) was added, and the materials were stirred at 70 degrees C. for 2 hours. The resultant was cooled to room temperature. To the resultant, a solution obtained by dissolving sodium hydroxide (1.06 g) in water (600 mL) was fed for washing. To the resultant, ethyl acetate (500 mL) was fed. An organic phase was extracted from the resultant and further washed with water. The organic phase was isolated and dried with magnesium sulfate to evaporate the solvent. The residue was refined by silica gel column chromatography using an n-hexane/ethyl acetate (at a volume ratio of 3/2) mixture solvent as an eluent, to obtain an intermediate reaction product represented by structural formula (I-2) below (61.5 g).

[Structural formula (I-2)]

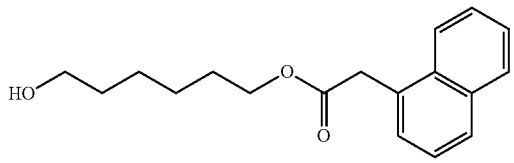

Next, the intermediate reaction product represented by structural formula (I-2) (43.0 g) (150 mmol) was dissolved in methylene chloride (250 mL). To the resultant, triethylamine (available from Tokyo Chemical Industry Co., Ltd.) (20.0 g) (198 mmol) was added. The resultant solution was cooled in an ice bath. Acrylic acid chloride (available from Tokyo Chemical Industry Co., Ltd.) (17.4 g) (192 mmol) was dropped into the solution for 30 minutes. Subsequently, the resultant was stirred in an ice bath for 1 hour and stirred at room temperature for 3 hours. A resultant precipitate was filtered out. The filtrate was washed with water, a saturated sodium hydrogen carbonate aqueous solution, and a saturated saline solution. Subsequently, an organic phase was isolated from the resultant and dried with magnesium sulfate to evaporate the solvent. The residue was refined by silica gel column chromatography using an n-hexane/ethyl acetate (at a volume ratio of 7/1) mixture solvent as an eluent, to obtain a monomer M-a3 (37.6 g).

[Monomer M-a3]

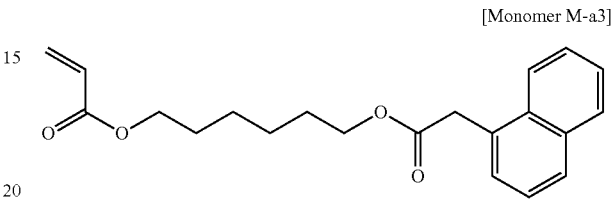

(Monomer Synthesis Example 3)
—Synthesis of Monomer M-a5—

1,10-Decanediol (available from Kanto Chemical Co., Inc.) (64.0 g) (367 mmol) was dissolved in dry tetrahydrofuran (900 mL). To the resultant, pyridine (17.4 g) (220 mmol) was added.

To the resultant solution, a solution obtained by dissolving 2-naphthalene carbonyl chloride (available from Tokyo Chemical Industry Co., Ltd.) (35.0 g) (183 mmol) in methylene chloride (1.00 mL) was dropped for 2 hours under stirring. Subsequently, the resultant was stirred at room temperature for 12 hours. To the resultant, ethyl acetate (500 mL) was added. The resultant was washed with water. An organic phase was isolated from the resultant and dried with magnesium sulfate to evaporate the solvent. The residue was refined by silica gel column chromatography using an n-hexane/ethyl acetate (at a volume rate of 4/1) mixture solvent as an eluent, to obtain an intermediate reaction product represented by structural formula (I-3) below (43.1 g).

[Structural formula (I-3)]

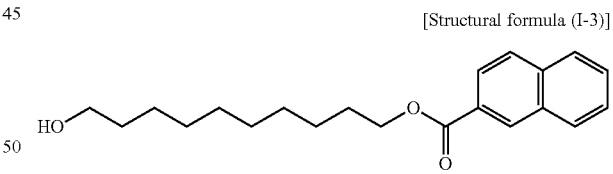

Next, the intermediate reaction product represented by structural formula (I-3) (32.8 g) (100 mmol) was dissolved in methylene chloride (400 mL). To the resultant, triethylamine (available from Tokyo Chemical Industry Co., Ltd.) (17.2 g) (170 mmol) was added. The resultant solution was cooled in an ice bath. Methacrylic acid chloride (available from Tokyo Chemical Industry Co., Ltd.) (15.0 g) (144 mmol) was dropped into the solution for 30 minutes. Subsequently, the resultant was stirred in an ice bath for 1 hour and stirred at room temperature for 4 hours. The solvent was evaporated from the reaction liquid. The resultant was dissolved in ethyl acetate (300 mL) and washed with water. An organic phase was isolated from the resultant and dried with magnesium sulfate to evaporate the solvent. The residue was refined by silica gel column chromatography using an n-hexane/methylene chloride (at a volume ratio of 3/2) mixture solvent as an eluent, to obtain a monomer M-a5 (32.1 g).

[Monomer M-a5]

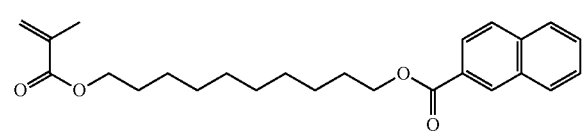

(Monomer Synthesis Example 4)
—Synthesis of Monomer M-b2—

Triethylene glycol (available from Tokyo Chemical Industry Co., Ltd.) (120.1 g) (800 mmol) and 1-naphthaleneacetic acid (37.2 g) (200 mmol) were put in a reaction vessel and heated to 70 degrees C. under stirring, to be dissolved. To the resultant, concentrated sulfuric acid (0.90 g) was added, and the materials were stirred at 70 degrees C. for 2 hours. The resultant was cooled to room temperature. Subsequently, a solution obtained by dissolving sodium hydroxide (0.80 g) in water (500 mL) was fed to the resultant for washing. Ethyl acetate (400 mL) was fed to the resultant. An organic phase was extracted from the resultant and further washed with water. The organic phase was isolated from the resultant and dried with magnesium sulfate to evaporate the solvent. The residue was refined by silica gel column chromatography using a methylene chloride/methanol (at a volume ratio of 19/1) mixture solvent, to obtain an intermediate reaction product represented by structural formula (I-4) below (48.7 g).

[Structural formula (I-4)]

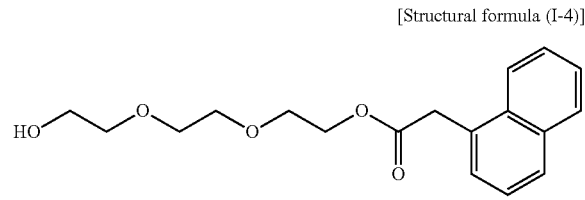 [SMILES: O=C(Cc1cccc2ccccc12)OCCOCCOCCO]

Next, the intermediate reaction product represented by structural formula (I-4) (31.2 g) (100 mmol) was dissolved in methylene chloride (200 mL). To the resultant, triethylamine (available from Tokyo Chemical Industry Co., Ltd.) (14.1 g) (140 mmol) was added. The resultant solution was cooled in an ice bath. To the resultant, acrylic acid chloride (available from Tokyo Chemical Industry Co., Ltd.) (12.6 g) (140 mmol) was dropped for 30 minutes. Subsequently, the resultant was stirred in an ice bath for 1 hour and stirred at room temperature for 3 hours. A resultant precipitate was filtered out. The filtrate was washed with water, a saturated sodium hydrogen carbonate aqueous solution, and a saturated saline solution. Subsequently, an organic phase was isolated from the resultant and dried with magnesium sulfate to evaporate the solvent. The residue was refined by silica gel column chromatography using an n-hexane/ethyl acetate (at a volume ratio of 3/2) mixture solvent as an eluent, to obtain a monomer M-b2 (30.5 g).

[Monomer M-b2]

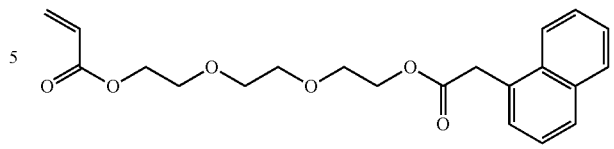

(Monomer Synthesis Example 5)
—Synthesis of Monomer M-b3—

Tetraethylene glycol (available from Tokyo Chemical Industry Co., Ltd.) (81.5 g) (420 mmol) was dissolved in methylene chloride (900 mL). To the resultant, pyridine (16.6 g) (210 mmol) was added.

To the resultant solution, a solution obtained by dissolving 2-naphthalene carbonyl chloride (available from Tokyo Chemical Industry Co., Ltd.) (40.0 g) (210 mmol) in methylene chloride (100 mL) was dropped for 2 hours under stirring. Subsequently, the resultant was stirred at room temperature for 6 hours. The obtained reaction solution was washed with water. Subsequently, an organic phase was isolated from the resultant and dried with magnesium sulfate to evaporate the solvent. The residue was refined by silica gel column chromatography using a methylene chloride/methanol (at a volume ratio of 19/1) mixture solvent as an eluent, to obtain an intermediate reaction product represented by structural formula (I-5) below (39.8 g).

[Structural formula (I-5)]

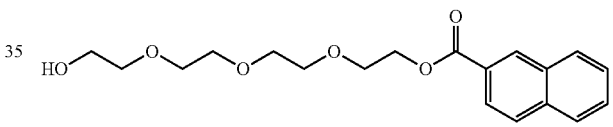

Next, the intermediate reaction product represented by structural formula (I-5) (36.6 g) (102 mmol) was dissolved in methylene chloride (600 mL). To the resultant, triethylamine (available from Tokyo Chemical Industry Co., Ltd.) (18.5 g) (183 mmol) was added. The resultant solution was cooled in an ice bath. To the resultant, methacrylic acid chloride (available from Tokyo Chemical Industry Co., Ltd.) (15.4 g) (148 mmol) was dropped for 30 minutes. Subsequently, the resultant was stirred in an ice bath for 1 hour and stirred at room temperature for 3 hours. A resultant precipitate was filtered out. The filtrate was washed with water, a saturated sodium hydrogen carbonate aqueous solution, and a saturated saline solution. Subsequently, an organic phase was isolated from the resultant and dried with magnesium sulfate to evaporate the solvent. The residue was refined by silica gel column chromatography using an n-hexane/ethyl acetate (at a volume ratio of 3/2) mixture solvent as an eluent, to obtain a monomer M-b3 (38.3 g).

[Monomer M-b3]

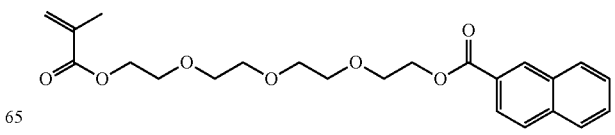

(Monomer Synthesis Example 6)
—Synthesis of Monomer M-c1—

Ethylene glycol (available from Wake Pure Chemical Industries, Ltd.) (150.0 g) (2.41 mol) and 1-naphthaleneacetic acid (available from Tokyo Chemical Industry Co., Ltd.) (50.0 g) (0.268 mol) were put in a reaction vessel and heated to 70 degrees C. under stirring to be dissolved. To the resultant, concentrated sulfuric acid (1.10 g) was added, and the materials were stirred at 70 degrees C. for 3 hours. The resultant was cooled to room temperature. Subsequently, a solution (250 mL) obtained by dissolving sodium hydroxide (1.80 g) in water (500 mL) was fed to the resultant. Ethyl acetate (200 mL) was fed to the resultant, and the resultant was washed with water. Subsequently, an organic phase was isolated from the resultant and dried with magnesium sulfate to evaporate the solvent. The residue was refined by silica gel column chromatography using a hexane/ethyl acetate (at a volume ratio of 3/2) mixture solvent as an eluent, to obtain an intermediate reaction product represented by structural formula (I-6) below (38.7 g).

[Structural formula (I-6)]

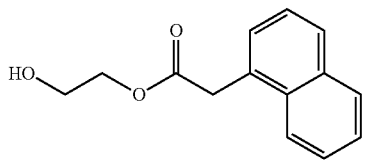

Next, the intermediate reaction product represented by structural formula (I-6) (35.7 g) (155 mmol) was dissolved in dry methyl ethyl ketone (100 ml) and heated to 50 degrees C. To the resultant solution, a solution obtained by dissolving 2-methacryloyloxy ethyl isocyanate (available from Showa Denko K.K., KARENZ MOI) (24.0 g) (155 mmol) in dry methyl ethyl ketone (20 mL) was dropped for 1 hour under stirring. Subsequently, the resultant was stirred at 60 degrees C. for 12 hours. The resultant was cooled to room temperature. Subsequently, the solvent was evaporated from the resultant. The residue was refined by silica gel column chromatography using an n-hexane/ethyl acetate (at a volume ratio of 2/1) mixture solvent as an eluent, to obtain a monomer M-c1 (44.2 g).

[Monomer M-c1]

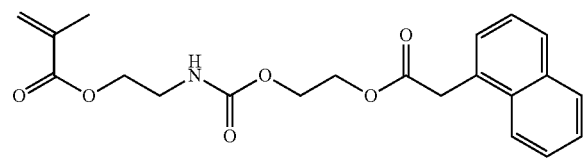

(Monomer Synthesis Example 7)
—Synthesis of Monomer M-c4—

1,10-Decanediol (available from Tokyo Chemical Industry Co., Ltd.) (120.0 g) (688 mol) and 1-naphthaleneacetic acid (available from Tokyo Chemical Industry Co., Ltd.) (27.9 g) (150 mmol) were put in a reaction vessel and heated to 70 degrees C. under stirring to be dissolved. To the resultant, concentrated sulfuric acid (0.62 g) was added, and the materials were stirred at 70 degrees C. for 3 hours. The resultant was cooled to room temperature. Subsequently, a solution (150 mL) obtained by dissolving sodium hydroxide (1.80 g) in water (500 mL) was fed to the resultant. Ethyl acetate (100 mL) was fed to the resultant. The resultant was washed with water. Subsequently, an organic phase was isolated from the resultant and dried with magnesium sulfate to evaporate the solvent. The residue was refined by silica gel column chromatography using a hexane/ethyl acetate (at a volume ratio of 3/1) mixture solvent as an eluent, to obtain an intermediate reaction product represented by structural formula (I-7) below (42.4 g).

[Structural formula (I-7)]

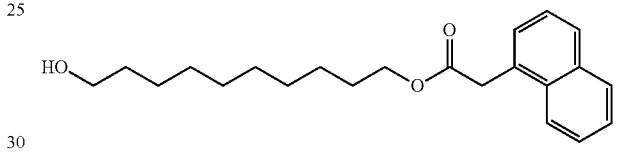

Next, the intermediate reaction product represented by structural formula (I-7) (84.2 g) (100 mmol) was dissolved in dry methyl ethyl ketone (100 mL) and heated to 50 degrees C. To the resultant solution, a solution obtained by dissolving 2-methacryloyloxy ethyl isocyanate (available from Showa Denko K.K., KARENZ MOI) (15.5 g) (100 mmol) in dry methyl ethyl ketone (20 mL) was dropped for 1 hour under stirring. Subsequently, the resultant was stirred at 60 degrees C. for 12 hours. The resultant was cooled to room temperature. Subsequently, the solvent was evaporated from the resultant. The residue was refined by silica gel column chromatography using an n-hexane/ethyl acetate (at a volume ratio of 2/1) mixture solvent as an eluent, to obtain a monomer M-c4 (38.1 g).

[Monomer M-c4]

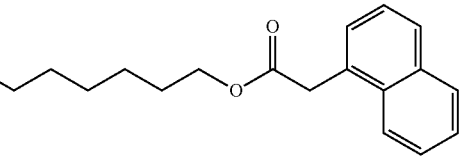

Synthesis Example 1

—Synthesis of Copolymer CP-1—

Acrylic acid (available from Tokyo Chemical Industry Co., Ltd.) (20.8 g) (282 mmol) and the monomer M-a1 (79.7 g) (234 mmol) were dissolved in dry methyl ethyl ketone (500 mL), to prepare a monomer solution. Ten percent by mass out of the monomer solution was heated to 75 degrees C. under an argon gas stream. To the resultant, a solution obtained by dissolving 2,2'-azobis(isobutyronitrile) (AIBN, available from Tokyo Chemical Industry Co., Ltd.) (5.0 g) in the remaining monomer solution was dropped for 2 hours. The resultant was stirred at 75 degrees C. for 6 hours. The resultant was cooled to room temperature. The obtained reaction solution was fed to hexane. A deposited copolymer was filtered out and dried at reduced pressure, to obtain a [copolymer CP-1] (with a weight average molecular weight (Mw) of 22,500) (95.7 g).

Synthesis Examples 2 to 17

—Synthesis of Copolymers CP-2 to 17—
[Copolymers CP-2 to 17] were obtained in the same manner as in Synthesis example 1, except that unlike in the synthesis of the copolymer CP-1 in Synthesis example 1, the monomer represented by general formula (2a), (2b), or (2c), the monomer containing an anionic group, and the any other monomer presented in Table 1-1 were used, AIBN and α-thioglycerol (available from Tokyo Chemical Industry Co., Ltd.) were used in the proportions presented in Table 1-2, and the polymerization temperature presented in Table 1-2 was used.

The weight average molecular weights Mw of the obtained copolymers CP-2 to 17 were as presented in Table 1-2.

TABLE 1-1

| | Kind of copolymer | Monomer of general formula (2a), (2b), or (2c) | | Monomer containing anionic group | | Any other monomer | |
|---|---|---|---|---|---|---|---|
| | | Kind | Proportion (part by mass) | Kind | Proportion (part by mass) | Kind | Proportion (part by mass) |
| Synthesis Ex. 1 | CP-1 | M-a1 | 79.7 | AA | 20.3 | — | 0.0 |
| Synthesis Ex. 2 | CP-2 | M-a3 | 82.5 | AA | 17.5 | — | 0.0 |
| Synthesis Ex. 3 | CP-3 | M-a5 | 77.5 | AA | 22.5 | — | 0.0 |
| Synthesis Ex. 4 | CP-4 | M-b2 | 83.0 | AA | 17.0 | — | 0.0 |
| Synthesis Ex. 5 | CP-5 | M-b3 | 76.3 | MAA | 23.7 | — | 0.0 |
| Synthesis Ex. 6 | CP-6 | M-c1 | 74.8 | AA | 25.2 | — | 0.0 |
| Synthesis Ex. 7 | CP-7 | M-c4 | 87.1 | AA | 12.9 | — | 0.0 |
| Synthesis Ex. 8 | CP-8 | M-c1 | 91.5 | AA | 8.5 | — | 0.0 |
| Synthesis Ex. 9 | CP-9 | M-a1 | 88.8 | MAA | 11.2 | — | 0.0 |
| Synthesis Ex. 10 | CP-10 | M-a5 | 75.4 | MAA | 24.6 | — | 0.0 |
| Synthesis Ex. 11 | CP-11 | M-c1 | 73.8 | AA | 26.2 | — | 0.0 |
| Synthesis Ex. 12 | CP-12 | M-b2 | 77.0 | AA | 23.0 | — | 0.0 |
| Synthesis Ex. 13 | CP-13 | M-a5 | 73.3 | AA | 26.7 | — | 0.0 |
| Synthesis Ex. 14 | CP-14 | M-a1 | 77.1 | AA | 22.9 | — | 0.0 |
| Synthesis Ex. 15 | CP-15 | M-b2 | 86.0 | AA | 14.0 | — | 0.0 |
| Synthesis Ex. 16 | CP-16 | M-a1 | 76.8 | MAA | 17.5 | Dodecyl methacrylate | 5.7 |
| Synthesis Ex. 17 | CP-17 | M-a1 | 78.1 | AA | 9.9 | Styrene | 12.0 |

The details of the components used in Table 1-1 are as follows.
AA: Acrylic acid (available from Tokyo Chemical Industry Co., Ltd.)
MAA: Methacrylic acid (available from Tokyo Chemical Industry Co., Ltd.)
Dodecyl methacrylate (available from Tokyo Chemical Industry Co., Ltd.)
Styrene (available from Tokyo Chemical Industry Co., Ltd.)

TABLE 1-2

| | Kind of copolymer | Polymerization initiator AIBN Proportion (part by mass) | Chain transfer regulator (thioglycerol) Proportion (part by mass) | Polymerization temperature (degrees C) | Ratio of general formula (2a), (2b), or (3c) (% by mass) | Weight average molecular weight Mw | Produced polymer Proportion (part by mass) |
|---|---|---|---|---|---|---|---|
| Synthesis Ex. 1 | CP-1 | 5.0 | 0 | 75 | 79.7 | 22,500 | 95.7 |
| Synthesis Ex. 2 | CP-2 | 4.0 | 0 | 75 | 82.5 | 26,300 | 97.8 |
| Synthesis Ex. 3 | CP-3 | 4.0 | 5.0 | 75 | 77.5 | 4,600 | 97.7 |
| Synthesis Ex. 4 | CP-4 | 4.5 | 0 | 75 | 83.0 | 21,000 | 95.6 |
| Synthesis Ex. 5 | CP-5 | 3.5 | 0 | 75 | 76.3 | 33,000 | 96.7 |
| Synthesis Ex. 6 | CP-6 | 5.0 | 0 | 75 | 74.8 | 22,000 | 96.7 |
| Synthesis Ex. 7 | CP-7 | 5.0 | 0 | 75 | 87.1 | 31,500 | 99.3 |
| Synthesis Ex. 8 | CP-8 | 3.0 | 0 | 75 | 91.5 | 27,400 | 96.0 |
| Synthesis Ex. 9 | CP-9 | 3.5 | 0 | 75 | 88.8 | 25,000 | 98.0 |
| Synthesis Ex. 10 | CP-10 | 4.0 | 5.0 | 75 | 75.4 | 4,800 | 97.7 |
| Synthesis Ex. 11 | CP-11 | 5.0 | 0 | 75 | 73.8 | 19,600 | 96.3 |
| Synthesis Ex. 12 | CP-12 | 1.0 | 0 | 65 | 77.0 | 43,000 | 95.9 |
| Synthesis Ex. 13 | CP-13 | 1.3 | 0 | 75 | 73.3 | 38,600 | 96.0 |
| Synthesis Ex. 14 | CP-14 | 5.0 | 3.0 | 75 | 77.1 | 5,400 | 96.7 |
| Synthesis Ex. 15 | CP-15 | 4.0 | 5.0 | 75 | 86.0 | 4,500 | 96.9 |
| Synthesis Ex. 16 | CP-16 | 3.5 | 0 | 75 | 76.8 | 26,000 | 97.9 |
| Synthesis Ex. 17 | CP-17 | 3.6 | 0 | 75 | 78.1 | 23,500 | 97.7 |

(Pigment Dispersion Preparation Example 1)
—Preparation of Pigment Dispersion PD-1—

The copolymer CP-1 (4.0 parts by mass) was dissolved in a tetraethylammonium hydroxide aqueous solution (80.0 parts by mass) in a manner to have pH of 8.0. To the obtained copolymer aqueous solution (84.0 parts by mass), carbon black (NIPEX 150, available from Degussa AG) (16.0 parts by mass) was added and stirred for 12 hours.

The obtained mixture was subjected to circulation dispersion at a peripheral velocity of 10 m/s for 1 hour using a disk-type bead mill (available from Shinmaru Enterprises Corporation, KDL TYPE, using zirconia balls having a diameter of 0.1 mm as media) and then subjected to filtration through a membrane filter having an average pore diameter of 1.2 μm. To the resultant, ion-exchanged water (adjustment amount) was added, to obtain [pigment dispersion PD-1] (with a pigment solid concentration of 16 percent by mass) (97.0 parts by mass).

(Pigment Dispersion Preparation Examples 2 to 22)
—Preparation of Pigment Dispersions PD-2 to 22—

Pigment dispersions PD-2 to 22 were obtained in the same manner as in Pigment dispersion preparation example 1, except that unlike in the preparation of the pigment dispersion PD-1, the copolymers CP-2 to 17 were used in the proportions (parts by mass) presented in Table 2, neutralizer aqueous solutions presented in Table 2 were used, and pigments presented in Table 2 were used.

Example 1

—Preparation of Ink GJ-1—

The pigment dispersion PD-1 (40.0 percent by mass), glycerin (10.0 percent by mass), 1,3-butanediol (10.0 percent by mass), 3-methoxy-N,N-dimethylpropionamide (15.0 percent by mass), 2-ethyl-1,3-hexanediol (1.0 percent by mass), 2,2,4-trimethyl-1,3-pentanediol (1.0 percent by mass), UNIDYNE DSN-403N (available from DAIKIN INDUSTRIES) (1.0 percent by mass), and ion-exchanged water (22.0 percent by mass) were mixed and stirred for 1 hour, and then filtrated through a membrane filter having an average pore diameter of 1.2 μm, to obtain an ink GJ-1 of Example 1.

Examples 2 to 22

—Preparation of Inks GJ-2 to 22—

Inks GJ-2 to 22 of Examples 2 to 22 were prepared using the same preparation method as in Example 1 based on the prescriptions presented in Table 3-1 to Table 3-3.

TABLE 3-1

| | | Pigment dispersion | | |
|---|---|---|---|---|
| | Ink name | Kind of pigment dispersion | Kind of copolymer | Proportion (percent by mass) |
| Ex. 1 | GJ-1 | PD-1 | CP-1 | 40.0 |
| Ex. 2 | GJ-2 | PD-2 | CP-2 | 40.0 |

TABLE 2

| Kind of pigment dispersion | Copolymer Kind | Copolymer Proportion (part by mass) | Neutralizer aqueous solution Kind of neutralizer | Neutralizer aqueous solution Proportion (part by mass) | Pigment (part by mass) Carbon black | Pigment (part by mass) Pigment blue 15:3 | Pigment (part by mass) Pigment red 122 | Pigment (part by mass) Pigment yellow 74 |
|---|---|---|---|---|---|---|---|---|
| PD-1 | CP-1 | 4.0 | TEAOH | 80.0 | 16.0 | — | — | — |
| PD-2 | CP-2 | 4.0 | TEAOH | 80.0 | 16.0 | — | — | — |
| PD-3 | CP-3 | 4.0 | TEAOH | 80.0 | 16.0 | — | — | — |
| PD-4 | CP-4 | 4.0 | TEAOH | 80.0 | 16.0 | — | — | — |
| PD-5 | CP-5 | 4.0 | TEAOH | 80.0 | 16.0 | — | — | — |
| PD-6 | CP-6 | 4.0 | NaOH | 80.0 | 16.0 | — | — | — |
| PD-7 | CP-7 | 4.0 | NaOH | 80.0 | 16.0 | — | — | — |
| PD-8 | CP-8 | 4.0 | NaOH | 80.0 | 16.0 | — | — | — |
| PD-9 | CP-9 | 4.0 | NaOH | 80.0 | 16.0 | — | — | — |
| PD-10 | CP-10 | 4.0 | DEA | 80.0 | 16.0 | — | — | — |
| PD-11 | CP-11 | 4.0 | DEA | 80.0 | 16.0 | — | — | — |
| PD-12 | CP-12 | 4.0 | DEA | 80.0 | 16.0 | — | — | — |
| PD-13 | CP-13 | 4.0 | NaOH | 80.0 | 16.0 | — | — | — |
| PD-14 | CP-14 | 4.0 | NaOH | 80.0 | 16.0 | — | — | — |
| PD-15 | CP-15 | 4.0 | NaOH | 80.0 | 16.0 | — | — | — |
| PD-16 | CP-16 | 4.0 | DEA | 80.0 | 16.0 | — | — | — |
| PD-17 | CP-17 | 4.0 | DEA | 80.0 | 16.0 | — | — | — |
| PD-18 | CP-1 | 1.6 | TEAOH | 82.4 | 16.0 | — | — | — |
| PD-19 | CP-1 | 10.0 | TEAOH | 74.0 | 16.0 | — | — | — |
| PD-20 | CP-1 | 6.0 | TEAOH | 74.0 | — | 20.0 | — | — |
| PD-21 | CP-1 | 6.0 | TEAOH | 74.0 | — | — | 20.0 | — |
| PD-22 | CP-1 | 6.0 | TEAOH | 74.0 | — | — | — | 20.0 |

In Table 2, the folowing abbreviations are used for the neutralizers and the pigments, and the products presented below were used as the neutralizers and the pigments.
-Neutralizer-
TEAOH: Tetraethylammonium hydroxide, available from Tokyo Chemical Industry Co., Ltd., a 35 percent by mass aqueous solution
NaOH: Sodium hydroxide, available from Kishida Chemical Co., Ltd.
DEA: Diethanolamine, available from Kanto Chemical Co., Inc.
-Pigment-
Pigment blue 15:3: CHROMOFINE BLUE A-220JC, available from Dainichiseika Color & Chemicals Mfg. Co., Ltd.
Pigment red 122: TONER MAGENTA EO02, available from Clariant AG
Pigment yellow 74: FAST YELLOW 531, available from Dainichiseika Color & Chemicals Mfg. Co., Ltd.

TABLE 3-1-continued

| | Ink name | Pigment dispersion Kind of pigment dispersion | Kind of copolymer | Proportion (percent by mass) |
|---|---|---|---|---|
| Ex. 3 | GJ-3 | PD-3 | CP-3 | 40.0 |
| Ex. 4 | GJ-4 | PD-4 | CP-4 | 40.0 |
| Ex. 5 | GJ-5 | PD-5 | CP-5 | 40.0 |
| Ex. 6 | GJ-6 | PD-6 | CP-6 | 40.0 |
| Ex. 7 | GJ-7 | PD-7 | CP-7 | 40.0 |
| Ex. 8 | GJ-8 | PD-8 | CP-8 | 40.0 |
| Ex. 9 | GJ-9 | PD-9 | CP-9 | 40.0 |
| Ex. 10 | GJ-10 | PD-10 | CP-10 | 40.0 |
| Ex. 11 | GJ-11 | PD-11 | CP-11 | 40.0 |
| Ex. 12 | GJ-12 | PD-12 | CP-12 | 40.0 |
| Ex. 13 | GJ-13 | PD-13 | CP-13 | 40.0 |
| Ex. 14 | GJ-14 | PD-14 | CP-14 | 40.0 |
| Ex. 15 | GJ-15 | PD-15 | CP-15 | 40.0 |
| Ex. 16 | GJ-16 | PD-16 | CP-16 | 40.0 |
| Ex. 17 | GJ-17 | PD-17 | CP-17 | 40.0 |
| Ex. 18 | GJ-18 | PD-18 | CP-1 | 40.0 |
| Ex. 19 | GJ-19 | PD-19 | CP-1 | 40.0 |
| Ex. 20 | GJ-20 | PD-20 | CP-1 | 40.0 |
| Ex. 21 | GJ-21 | PD-21 | CP-1 | 40.0 |
| Ex. 22 | GJ-22 | PD-22 | CP-1 | 40.0 |

TABLE 3-3

| | Ink name | Surfactant (percent by mass) UNIDYNE-403N | Water (percent by mass) Pure water | Total (percent by mass) |
|---|---|---|---|---|
| Ex. 1 | GJ-1 | 1.0 | 22.0 | 100.0 |
| Ex. 2 | GJ-2 | 2.0 | 26.0 | 100.0 |
| Ex. 3 | GJ-3 | 1.0 | 23.0 | 100.0 |
| Ex. 4 | GJ-4 | 1.0 | 22.0 | 100.0 |
| Ex. 5 | GJ-5 | 1.0 | 22.0 | 100.0 |
| Ex. 6 | GJ-6 | 1.0 | 23.0 | 100.0 |
| Ex. 7 | GJ-7 | 2.0 | 12.0 | 100.0 |
| Ex. 8 | GJ-8 | 1.0 | 17.0 | 100.0 |
| Ex. 9 | GJ-9 | 1.0 | 22.0 | 100.0 |
| Ex. 10 | GJ-10 | 1.0 | 17.0 | 100.0 |
| Ex. 11 | GJ-11 | 2.0 | 17.0 | 100.0 |
| Ex. 12 | GJ-12 | 1.0 | 18.0 | 100.0 |
| Ex. 13 | GJ-13 | 1.0 | 22.0 | 100.0 |
| Ex. 14 | GJ-14 | 2.0 | 21.0 | 100.0 |
| Ex. 15 | GJ-15 | 1.0 | 17.0 | 100.0 |
| Ex. 16 | GJ-16 | 1.0 | 22.0 | 100.0 |
| Ex. 17 | GJ-17 | 1.0 | 18.0 | 100.0 |
| Ex. 18 | GJ-18 | 1.0 | 23.0 | 100.0 |
| Ex. 19 | GJ-19 | 1.0 | 17.0 | 100.0 |
| Ex. 20 | GJ-20 | 1.0 | 22.0 | 100.0 |

TABLE 3-2

| | Ink name | Organic solvent (percent by mass) | | | | | | | |
|---|---|---|---|---|---|---|---|---|---|
| | | Glycerin | 1,3-butanediol | 3-methoxy-N,N-dimethyl propion amide | 3-ethyl-3-hydroxy methyl oxetane | Ethylene glycol monobutyl ether | 2-pyrolidone | 2-ethyl-1,3-hexane diol | 2,2,4-trimethyl-1,3-pentane diol |
| Ex. 1 | GJ-1 | 10.0 | 10.0 | 15.0 | — | — | — | 1.0 | 1.0 |
| Ex. 2 | GJ-2 | 10.0 | — | 20.0 | — | — | — | 1.0 | 1.0 |
| Ex. 3 | GJ-3 | 10.0 | 15.0 | 10.0 | — | — | — | 1.0 | — |
| Ex. 4 | GJ-4 | 5.0 | 30.0 | — | — | — | — | 1.0 | 1.0 |
| Ex. 5 | GJ-5 | 10.0 | 10.0 | 10.0 | 5.0 | — | — | 1.0 | 1.0 |
| Ex. 6 | GJ-6 | 10.0 | 10.0 | 5.0 | 10.0 | — | — | — | 1.0 |
| Ex. 7 | GJ-7 | 10.0 | 20.0 | — | 15.0 | — | — | 1.0 | — |
| Ex. 8 | GJ-8 | — | 5.0 | — | 35.0 | — | — | 1.0 | 1.0 |
| Ex. 9 | GJ-9 | 10.0 | 5.0 | — | — | 10.0 | 10.0 | 1.0 | 1.0 |
| Ex. 10 | GJ-10 | 10.0 | — | 30.0 | — | — | — | 1.0 | 1.0 |
| Ex. 11 | GJ-11 | 10.0 | 10.0 | 20.0 | — | — | — | — | 1.0 |
| Ex. 12 | GJ-12 | 10.0 | — | 10.0 | 10.0 | 5.0 | 5.0 | 1.0 | — |
| Ex. 13 | GJ-13 | 10.0 | 25.0 | — | — | — | — | 1.0 | 1.0 |
| Ex. 14 | GJ-14 | 10.0 | 10.0 | — | 5.0 | — | 10.0 | 1.0 | 1.0 |
| Ex. 15 | GJ-15 | 10.0 | 10.0 | 10.0 | — | 10.0 | — | 1.0 | 1.0 |
| Ex. 16 | GJ-16 | — | 10.0 | 15.0 | — | 10.0 | — | 1.0 | 1.0 |
| Ex. 17 | GJ-17 | 20.0 | — | 10.0 | 10.0 | — | — | — | 1.0 |
| Ex. 18 | GJ-18 | 15.0 | — | 10.0 | 10.0 | — | — | 1.0 | — |
| Ex. 19 | GJ-19 | 10.0 | 10.0 | 15.0 | 5.0 | — | — | 1.0 | 1.0 |
| Ex. 20 | GJ-20 | 10.0 | 20.0 | — | 5.0 | — | — | 1.0 | 1.0 |
| Ex. 21 | GJ-21 | 10.0 | 20.0 | — | 10.0 | — | — | — | 1.0 |
| Ex. 22 | GJ-22 | 10.0 | 30.0 | — | 10.0 | — | — | 1.0 | 1.0 |

TABLE 3-3-continued

| Ink name | Surfactant (percent by mass) UNIDYNE-403N | Water (percent by mass) Pure water | Total (percent by mass) |
|---|---|---|---|
| Ex. 21 | GJ-21 | 2.0 | 17.0 | 100.0 |
| Ex. 22 | GJ-22 | 1.0 | 7.0 | 100.0 |

Comparative Example 1

—Preparation of Comparative Ink RGJ-1—

Acrylic acid (2.20 g) (30.5 mmol), benzyl methacrylate (available from Tokyo Chemical Industry Co., Ltd.) (3.40 g) (19.3 mmol), and dodecyl methacrylate (4.40 g) (17.3 mmol) were dissolved in dry methyl ethyl ketone (40 mL), to prepare a monomer solution. Ten percent by mass out of the monomer solution was heated to 75 degrees C. under an argon gas stream. To the resultant, a solution obtained by dissolving 2,2-azobis(isobutyronitrile) (0.295 g) in the remaining monomer solution was dropped for 1.5 hours. The resultant was stirred at 75 degrees C. for 6 hours. The resultant was cooled to room temperature. The obtained reaction solution was fed to hexane. A deposited copolymer was filtered out and dried at reduced pressure, to obtain a copolymer (with a weight average molecular weight (Mw) of 17,000) (9.21 g).

Next, using this copolymer, an aqueous solution of a comparative copolymer RCP-1 was prepared in the same manner as in Example 1.

That is, a comparative pigment dispersion RPD-1 was obtained in the same manner, except that the comparative copolymer RCP-1 was used instead of the copolymer CP-1 used in the preparation of the pigment dispersion PD-1.

Next, a comparative ink RGJ-1 was obtained in the same manner, except that the comparative pigment dispersion RPD-1 was used instead of the pigment dispersion PD-1 used in the production of the ink of Example 1.

Comparative Example 2

—Preparation of Comparative Ink RGJ-2—

A comparative pigment dispersion RPD-2 was obtained in the same manner as in the preparation of the pigment dispersion PD-20, except that the comparative copolymer RCP-1 was used instead of the copolymer CP-1.

Next, a comparative ink RGJ-2 was obtained in the same manner as in the production of the ink of Example 20, except that the comparative pigment dispersion RPD-2 was used instead of the pigment dispersion PD-20.

Comparative Example 3

—Preparation of Comparative Ink RGJ-3—

A comparative pigment dispersion RPD-3 was obtained in the same manner as in the preparation of the pigment dispersion PD-21, except that the comparative copolymer RCP-1 was used instead of the copolymer CP-1.

Next, a comparative ink RGJ-3 was obtained in the same manner as in the production of the ink of Example 21, except that the comparative pigment dispersion RPD-3 was used instead of the pigment dispersion PD-21.

Comparative Example 4

—Preparation of Comparative Ink RGJ-4—

A comparative pigment dispersion RPD-4 was obtained in the same manner as in the preparation of the pigment dispersion PD-22, except that the comparative copolymer RCP-1 was used instead of the copolymer CP-1.

Next, a comparative ink RGJ-4 was obtained in the same manner as in the production of the ink of Example 22, except that the comparative pigment dispersion RPD-4 was used instead of the pigment dispersion PD-22.

Comparative Example 5

—Preparation of Comparative Ink RGJ-5—

2-Phenoxyethyl methacrylate as a monomer (80 g), 3-mercapto-1-propanol as a chain transfer agent (3.7 g), and 2,2-azobis(2,4-dimethylvaleronitrile) as an initiator (0.3 g) were dissolved in tetrahydrofuran (THF) (160 mL), and heated to 65 degrees C. under a nitrogen atmosphere to be allowed to undergo a reaction for 7 hours. The obtained solution was left to cool. To the resultant, dibutyl tin (IV) dilaurate (80 mg) and hydroquinone (catalytic amount) were added. To the resultant, 2-methacryloyloxyethyl isocyanate (10.0 g) was dropped. The resultant was heated to 50 degrees C. and allowed to undergo a reaction for 2.5 hours. Subsequently, the resultant was subjected to reprecipitation using a mixture solvent of methanol and water for refinement, to obtain a macromonomer MM-1 (with a weight average molecular weight (Mw) of 4,000 and a number average molecular weight (Mn) of 1,900) (71 g).

Next, methyl ethyl ketone (20 g) was heated to 75 degrees C. under a nitrogen atmosphere. To the resultant, a solution obtained by dissolving dimethyl 2,2'-azobisisobutyrate (1.16 g), the macromonomer MM-1 obtained above (9 g), p-styrenesulfonic acid (1.8 g), and methyl methacrylate (49.2 g) in methyl ethyl ketone (40 g) was dropped for 3 hours. After dropping was completed, the resultant was allowed to further undergo a reaction for 1 hour. To the resultant, a solution obtained by dissolving dimethyl 2,2'-azobisisobutyrate (0.2 g) in methyl ethyl ketone (0.6 g) was added. The resultant was heated to 80 degrees C., and stirred under heating for 4 hours. To the resultant, a solution obtained by dissolving dimethyl 2,2'-azobisisobutyrate (0.2 g) in methyl ethyl ketone (0.6 g) was added. The resultant was stirred under heating for 6 hours. The resultant was cooled. The obtained reaction solution was fed to hexane. A deposited graft polymer was filtered out and dried, to obtain a comparative copolymer RCP-2.

Next, a comparative pigment dispersion RPD-5 was obtained in the same manner as in the preparation of the pigment dispersion PD-1, except that the comparative copolymer RCP-2 was used instead of the copolymer CP-1.

Next, a comparative ink RGJ-5 was obtained in the same manner as in the production of the ink of Example 1, except that the comparative pigment dispersion RPD-5 was used instead of the pigment dispersion PD-1.

Comparative Example 6

<Preparation of Comparative Ink RGJ-6>
—Synthesis of Comparative Copolymer RCP-3—

2-Naphthol (available from Tokyo Chemical Industry Co., Ltd.) (72.0 g) (500 mmol) and ethylene glycol mono-2-chloroethyl ether (available from Tokyo Chemical Industry Co., Ltd.) (125.0 g) (1,000 mmol) were dissolved in N-methyl-2-pyrrolidinone (available from Kanto Chemical Co., Inc.) (500 mL), and stirred at room temperature for 1 hour. The resultant was further stirred at 110 degrees C. for 10 hours. The resultant was cooled to room temperature.

Subsequently, pure water (2,500 ml) was added to the obtained reaction solution and stirred at room temperature for 1 hour. A deposited solid was filtered out and dried at reduced pressure.

The solid (70.0 g) obtained from the above reaction and triethylamine (available from Tokyo Chemical Industry Co., Ltd.) (45.0 g) (450 mmol) were dissolved in tetrahydrofuran (250 ml) and stirred in an ice bath for 30 minutes. To the resultant, methacryloyl chloride (available from Wako Pure Chemical Industries, Ltd.) (36.6 g) (350 mmol) was slowly dropped. The resultant was further stirred in an ice bath for 3 hours. To the obtained solution, ethyl acetate (250 ml) and pure water (100 mL) were added for water washing. Subsequently, the ethyl acetate layer was isolated and washed with a saturated saline solution. The ethyl acetate layer was isolated and dried with magnesium sulfate to evaporate the solvent. The residue was refined by silica gel column chromatography, to obtain a monomer represented by structural formula (7) below (80.5 g).

[Structural formula (7)]

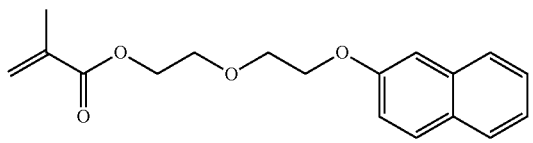

Next, methyl ethyl ketone (12.0 g) was added into a 100 mL three-necked flask equipped with a stirrer and a condenser tube and heated to 72 degrees C. under an argon gas stream. To the resultant, a solution obtained by dissolving the monomer represented by structural formula (7) (2.4 g) (8.00 mmol), methacrylic acid (available from Tokyo Chemical Industry Co., Ltd.) (1.2 g) (13.9 mol), benzyl methacrylate (available from Tokyo Chemical Industry Co., Ltd.) (8.4 g) (47.6 mmol), dimethyl 2,2'-azobis(isobutyrate) (available from Wako Pure Chemical Industries, Ltd.) (0.128 g) (0.56 mmol) in methyl ethyl ketone (6.0 g) was dropped for 3 hours. After dropping was completed, the resultant was further allowed to undergo a reaction for 1 hour. To the resultant, a solution obtained by dissolving dimethyl 2,2'-azobis(isobutyrate) (0.06 g) (0.26 mmol) in methyl ethyl ketone (2.0 g) was added. The resultant was heated to 78 degrees C. and stirred for 4 hours. Subsequently, the resultant was subjected to reprecipitation twice using hexane, to refine the copolymer. After the refining operation, the copolymer was filtered out and dried at reduced pressure, to obtain a comparative copolymer RCP-3 (with a weight average molecular weight (Mw) of 34,000) (11.6 g).

—Preparation of Comparative Pigment Dispersion RPD-6—

The comparative copolymer RCP-3 (4.0 parts by mass) was dissolved in a 35 percent by mass tetraethylammonium hydroxide aqueous solution (available from Tokyo Chemical Industry Co., Ltd.) (1.9 parts by mass), 3-methoxy-N,N'-dimethylpropionamide (50.0 parts by mass), and ion-exchanged water (28.1 parts by mass).

To the aqueous solution (84.0 parts by mass) of the comparative copolymer RCP-3, carbon black (NIPEX 150 available from Degussa AG) (16.0 parts by mass) was added and stirred for 12 hours. The obtained mixture was subjected to circulation dispersion at a peripheral velocity of 10 m/s for 1 hour using a disk-type bead mill (available from Shinmaru Enterprises Corporation. KDL TYPE, using zirconia balls having a diameter of 0.1 mm as media) and then subjected to filtration through a membrane filter having a pore diameter of 1.2 µm. To the resultant, ion-exchanged water (adjustment amount) was added, to obtain a comparative pigment dispersion RPD-6 (with a pigment solid concentration of 16 percent by mass) (95.0 parts by mass).

—Preparation of Comparative Ink RGJ-6—

The comparative pigment dispersion RPD-6 (40.0 parts by mass), 1,3-butanediol (10.0 parts by mass), glycerin (10.0 parts by mass), 2-ethyl-1,3-hexanediol (1.0 part by mass), 2,2,4-trimethyl-1,3-pentanediol (1.0 part by mass), UNIDYNE DSN-403N (available from DAIKIN INDUSTRIES, with a solid concentration of 100 percent by mass) (1.0 part by mass), and ion-exchanged water (37.0 parts by mass) were mixed and stirred for 1 hour. Subsequently, the resultant was filtrated through a membrane filter having a pore diameter of 1.2 µm, to obtain a comparative ink RGJ-6.

Comparative Example 7

—Preparation of Comparative Ink RGJ-7—

Ethyl acetate (20.0 g), acrylic acid (available from Tokyo Chemical Industry Co., Ltd.) (3.8 g) (52.7 mmol), 1-vinyl-naphthalene (available from Tokyo Chemical Industry Co., Ltd.) (1.7 g) (11.0 mmol), and methyl acrylate (available from Tokyo Chemical Industry Co., Ltd.) (4.5 g) (52.3 mmol) were added into a 100 mL three-necked flask equipped with a stirrer and a condenser tube, and 2,2-azobis (2,4-dimethylvaleronitrile) (available from Tokyo Chemical Industry Co., Ltd.) (0.05 g) (0.2 mmol) was further added. The materials were heated to reflux for 6 hours under an argon gas stream. After the reaction ended, the resultant was cooled to room temperature, and the solvent was evaporated. To the residue, 2-propanol (56 g) was added and dissolved. The resultant was neutralized with triethanolamine (available from Tokyo Chemical Industry Co., Ltd.). To the resultant, ion-exchanged water was added to adjust the total to 100 g, to obtain a solution of an intended comparative copolymer RCP-4. Part of the resultant was dried to measure the molecular weight. As a result, the weight average molecular weight (Mw) was 23,500.

—Preparation of Comparative Pigment Dispersion RPD-7—

The solution (40 parts by mass) of the comparative copolymer RCP-4 was diluted with ion-exchanged water (44 parts by mass).

Carbon black (NIPEX 150, available from Degussa AG) (16.0 parts by mass) was added to an aqueous solution (84.0 parts by mass) of the comparative copolymer RCP-4 and stirred for 12 hours. The obtained mixture was subjected to circulation dispersion at a peripheral velocity of 10 m/s for 1 hour using a disk-type bead mill (available from Shinmaru Enterprises Corporation, KDL TYPE, using zirconia balls having a diameter of 0.1 mm as media), and then subjected to filtration through a membrane filter having a pore diameter of 1.2 µm. To the resultant, ion-exchanged water (adjustment amount) was added, to obtain a comparative pigment dispersion RPD-7 (with a pigment solid concentration of 16 percent by mass) (95.0 parts by mass).

—Preparation of Comparative Ink RGJ-7—

The comparative pigment dispersion RPD-7 (40.0 parts by mass), 1,3-butanediol (10.0 parts by mass), glycerin (10.0 parts by mass), 2-ethyl-1,3-hexanediol (1.0 part by mass), 2,2,4-trimethyl-1,3-pentanediol (1.0 part by mass), UNIDYNE DSN-403N (available from DAIKIN INDUSTRIES, with a solid concentration of 100 percent by mass) (1.0 part by mass), and ion-exchanged water (37.0 parts by mass)

were mixed, stirred for 1 hour, and then filtrated through a membrane filter having a pore diameter of 1.2 μm, to obtain a comparative ink RGJ-7.

Comparative Example 8

—Preparation of Comparative Ink RGJ-8—

A styrene-maleic anhydride copolymer [SMA1000P, available from Kawahara Petrochemical Co., Ltd., with a weight average molecular weight (Mw) of 5,500 and a number average molecular weight (Mn) of 2,000] (0.2 g) and an intermediate reaction product represented by structural formula (I-1) above (0.64 g) (3 mmol) were dissolved in dry dimethylformamide (8 mL) and stirred at 120 degrees C. for 12 hours. The obtained reaction solution was diluted with toluene, and the solvent was evaporated. The residue was refined by recycle HPLC (LC-9201, available from Japan Analytical Industry Co., Ltd., using tetrahydrofuran as an eluent, at a flow rate of 3.5 mL/min), to obtain a comparative copolymer RCP-5 [with a weight average molecular weight (Mw) of 5,800 and a number average molecular weight (Mn) of 2,300] (0.18 g).

Next, a comparative pigment dispersion RPD-8 was obtained in the same manner as in the preparation of the pigment dispersion PD-1, except that the comparative copolymer RCP-5 was used instead of the copolymer CP-1.

Next, a comparative ink RGJ-8 was obtained in the same manner as in the production of the ink of Example 1, except that the comparative pigment dispersion RPD-8 was used instead of the pigment dispersion PD-1.

Comparative Example 9

—Preparation of Comparative Ink RGJ-9—

An intermediate reaction product represented by structural formula (I-1) above (42.1 g) (155 mmol) was dissolved in dry methyl ethyl ketone (80 mL) and heated to 60 degrees C. To this solution, a solution obtained by dissolving 2-methacryloyloxyethyl isocyanate (available from Showa Denko K.K., KARENZ MOD (24.0 g) (155 mmol) in dry methyl ethyl ketone (20 mL) was dropped for 1 hour under stirring. Subsequently, the resultant was stirred at 70 degrees C. for 12 hours. The resultant was cooled to room temperature. Subsequently, the solvent was evaporated from the resultant. The residue was refined by silica gel column chromatography using a methylene chloride/methanol (at a volume ratio of 99/1) mixture solvent as an eluent, to obtain a monomer represented by structural formula (A) below (57.0 g).

[Structural formula (A)]

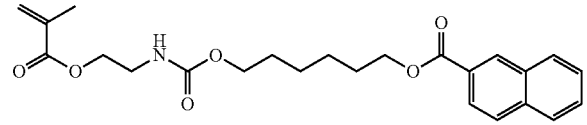

Next, acrylic acid (available from Sigma-Aldrich Co., LLC) (1.08 g) (15.0 mmol), the monomer represented by structural formula (A) (4.27 g) (10.0 mmol), a multifunctional acrylate A-TMPT (available from Shin-Nakamura Chemical. Co., Ltd.) (0.3 g) (1 mmol), and 2,2'-azobis (isobutyronitrile) (available from Tokyo Chemical Industry Co., Ltd.) (0.12 g) (0.71 mmol) were dissolved in dry methyl ethyl ketone (36 mL) and stirred under an argon gas stream at 75 degrees C. for 5 hours. The resultant was cooled to room temperature. The obtained reaction solution was fed to hexane. The resultant was further subjected to reprecipitation using hexane repeatedly 4 times, to refine the copolymer. The deposited copolymer was filtered out and dried at reduced pressure, to obtain a comparative copolymer RCP-6 (with a weight average molecular weight (Mw) of 52,300 and a number average molecular weight (Mn) of 14,300) (5.09 g).

Next, a comparative pigment dispersion RPD-9 was obtained in the same manner as in the preparation of the pigment dispersion PD-1, except that the comparative copolymer RCP-6 was used instead of the copolymer CP-1.

Next, a comparative ink RGJ-9 was obtained in the same manner as in the production of the ink of Example 1, except that the comparative pigment dispersion RPD-9 was used instead of the pigment dispersion PD-1.

[Evaluation Results]

The inks of Examples 1 to 22 and Comparative Examples 1 to 9 were evaluated in the evaluation manners described below. The results are presented in Table 4.

<Storage Stability of Pigment Dispersion>

Each pigment dispersion (16 mL) was filled in a glass container having a capacity of 30 mL and stored at 70 degrees C. for 3 weeks. The rate of change of the viscosity after storage to the viscosity before storage was calculated according to the formula below and evaluated according to the criteria described below. The grade C or higher is the practically usable level.

$$\text{Viscosity change rate (\%)} = \frac{(\text{viscosity of pigment dispersion after storage} - \text{viscosity of pigment dispersion before storage})}{(\text{viscosity of pigment dispersion before storage})} * 100$$

A viscometer (RE80L, available from TOKI SANGYO CO., LTD.) was used for measurement of the viscosity. The viscosity at 26 degrees C. was measured at 50 Rotations.

[Evaluation Criteria]

A+: The viscosity change rate was within ±3 percent.

A: The viscosity change rate was out of ±3 percent but within ±5 percent.

B: The viscosity change rate was out of ±5 percent but within ±8 percent.

C: The viscosity change rate was out of ±8 percent but within ±10 percent.

D: The viscosity change rate was out of ±10 percent but within ±30 percent.

E: The viscosity change rate was out of ±30 percent (unevaluable because of gelation).

<Storage Stability of Ink>

Each ink was filled in an ink stored container and stored at 70 degrees C. for 3 weeks. The rate of change of the viscosity after storage to the viscosity before storage was calculated according to the formula below and evaluated according to the criteria described below. The grade C or higher is the practically usable level.

$$\text{Viscosity change rate (\%)} = \frac{(\text{viscosity of ink after storage} - \text{viscosity of ink before storage})}{(\text{viscosity of ink before storage})} * 100$$

A viscometer (RE80L, available from TOKI SANGYO CO., LTD.) was used for measurement of the viscosity. The viscosity at 26 degrees C. was measured at 50 rotations.
[Evaluation Criteria]

A+: The viscosity change rate was within ±3 percent.

A: The viscosity change rate was out of ±3 percent but within ±5 percent.

B: The viscosity change rate was out of ±percent but within ±8 percent.

C: The viscosity change rate was out of ±8 percent but within ±10 percent.

D: The viscosity change rate was out of ±10 percent but within ±30 percent.

E: The viscosity change rate was out of ±30 percent (unevaluable because of gelation).

<Image Density>

With an inkjet printer (available from Ricoh Co., Ltd., IPSIO GX5000) loaded with each ink at 23 degrees C. at 50 percent RH, a chart that was generated with MICROSOFT WORD 2000 (available from Microsoft Corporation) and in which a 64-point general symbol 2223 of JIS X 0208 (1997) was drawn was printed on plain paper 1 (XEROX4200, available from XEROX Corporation) and plain paper 2 (MYPAPER, available from Ricoh Co., Ltd.). The symbol portions of the printed surfaces were colorimetered with X-RITE 938 (available from X-Rite Inc.) and evaluated according to the criteria described below.

The printing mode used was a "plain paper-standard or quick" mode modified to "without chromatic compensation" by user setting for plain paper made through a driver provided as an attachment to the printer.

Note that what is specified by 2223 of JIS X 0208 (1997) is a symbol having an equilateral quadrilateral contour and solidly painted with the ink.

[Evaluation Criteria]
(Black)

A: 1.25 or higher

B: 1.20 or higher but lower than 1.25

C: 1.10 or higher but lower than 1.20

D: Lower than 1.10

E: It was impossible to print the chart because the pigment gelated and was unable to disperse in the ink.

(Yellow)

A: 0.80 or higher

B: 0.75 or higher but lower than 0.80

C: 0.70 or higher but lower than 0.75

D: Lower than 0.70

E: It was impossible to print the chart because the pigment gelated and was unable to disperse in the ink.

(Magenta)

A: 0.95 or higher

B: 0.85 or higher but lower than 0.95

C: 0.75 or higher but lower than 0.85

D: Lower than 0.75

E: It was impossible to print the chart because the pigment gelated and was unable to disperse in the ink.

(Cyan)

A: 1.05 or higher

B: 0.95 or higher but lower than 1.05

C: 0.85 or higher but lower than 0.95

D: Lower than 0.85

E: It was impossible to print the chart because the pigment gelated and was unable to disperse in the ink.

<Discharging Recoverability>

With an inkjet printer (available from Ricoh Co., Ltd, IPSIO GX5000) filled with the ink of each of Examples 1 to 22 and Comparative Examples 1 to 9 and left to stand in a HL environment (at 32 degrees C.±0.5 degrees C. and 15±5 percent RH) for 3 hours, a nozzle check pattern was printed, to confirm that there were no discharging disorders such as dot void or distorted discharging. Subsequently, the inkjet printer was further left to stand in this state for 10 days. After standing was completed, a nozzle check pattern including a solid image portion was printed on 1 sheet of high-quality paper (MYPAPER, available from Ricoh Co., Ltd.) having a basis weight of 69.6 g/m², a sizing degree of 23.2 seconds, and an air resistance of 21.0 seconds, to confirm presence or absence of dot void or distorted discharging. When any dot void or distorted discharging was recognized in the nozzle check pattern, cleaning of the printer nozzles was performed as an operation for restoring normal printing, and the total number of cleaning operations was evaluated. Based on the obtained total number, discharging recoverability of each ink was evaluated according to the evaluation criteria described below.

[Evaluation Criteria]

A: 0 time of cleaning

B: 1 time of cleaning

C: 2 times of cleaning

D: 3 times or more but less than 5 times of cleaning

E: 5 times or more of cleaning

TABLE 4

|  | Storage stability of pigment dispersion | Storage stability of ink | Plain paper Image density 1 | Image density 2 | Discharging recoverability |
| --- | --- | --- | --- | --- | --- |
| Ex. 1 | A+ | A+ | A | A | A |
| Ex. 2 | A+ | A+ | A | A | A |
| Ex. 3 | A+ | A | B | B | B |
| Ex. 4 | A+ | A+ | A | A | A |
| Ex. 5 | A+ | A+ | A | A | A |
| Ex. 6 | A | B | A | A | B |
| Ex. 7 | A+ | A+ | A | A | A |
| Ex. 8 | A | B | A | A | B |
| Ex. 9 | A+ | A+ | A | A | A |
| Ex. 10 | A+ | A | B | B | B |
| Ex. 11 | A | B | A | A | B |
| Ex. 12 | A | B | A | A | B |
| Ex. 13 | A | B | A | A | B |
| Ex. 14 | A+ | A+ | A | A | A |
| Ex. 15 | A+ | A | B | B | B |
| Ex. 16 | A+ | A+ | A | A | A |
| Ex. 17 | B | B | A | A | C |

TABLE 4-continued

|  | | Plain paper | | | |
|---|---|---|---|---|---|
|  | Storage stability of pigment dispersion | Storage stability of ink | Image density 1 | Image density 2 | Discharging recoverability |
| Ex. 18 | A+ | A | A | A | B |
| Ex. 19 | A+ | A | A | A | B |
| Ex. 20 | A+ | A+ | A | A | A |
| Ex. 21 | A+ | A | A | A | B |
| Ex. 22 | A+ | A+ | A | A | A |
| Comp. Ex. 1 | D | D | C | C | E |
| Comp. Ex. 2 | D | D | D | D | E |
| Comp. Ex. 3 | D | D | D | D | E |
| Comp. Ex. 4 | D | D | D | D | E |
| Comp. Ex. 5 | D | D | C | C | E |
| Comp. Ex. 6 | D | D | C | C | E |
| Comp. Ex. 7 | D | D | C | C | E |
| Comp. Ex. 8 | B | B | A | A | D |
| Comp. Ex. 9 | A+ | A+ | A | A | D |

From the results of Table 4, the inks of Examples 1 to 22 produced using a copolymer containing a naphthyl group at a side-chain terminal were better in storage stability, image density, and discharging recoverability than the inks of Comparative Examples 1 to 5 produced using a copolymer free of a naphthyl group at a side-chain terminal. This is considered attributable to a higher adsorbability to the pigment owing to π-π interaction between the naphthyl group of the copolymer and the pigment.

Comparative Example 6 corresponds to Japanese Unexamined Patent Application Publication No. 2009-299005, Comparative Example 7 corresponds to Japanese Unexamined Patent Application Publication No. 2007-153976, Comparative Example 8 corresponds to Japanese Unexamined Patent Application Publication No. 2015-117354, and Comparative Example 9 corresponds to United States Patent Application Publication No. 2016/0017075. Even the presence of a naphthyl group at a side-chain terminal was not able to make storage stability of the inks sufficient depending on the structural unit containing the naphthyl group or selection of another monomer used for synthesizing the copolymer, and these inks did not have a sufficient level of discharging recoverability although these inks were not considerably poor in qualities such as image density and ink storage stability.

In Comparative Example 8, any other monomer, particularly, a hydrophobic structural unit such as a styrene derivative, was contained in the copolymer in an amount of 10 percent by mass or greater. Therefore, it is considered that the effect of functional separation between the side-chain terminal pigment adsorbing site and the main-chain ionic site was poor, leading to a poor pigment adsorbing effect.

In Comparative Example 9, the structural unit containing a naphthyl group contained a hydrogen-bondable urethane bond, which combined with the terminal naphthyl group to increase interaction with an adjoining naphthyl group-containing structural unit. This was considered to make aggregation more likely to occur upon evaporation of the water content and a consequent increase of the solid concentration.

The structural unit containing a naphthyl group used in the present disclosure contains 2 ester bonds and is weaker than the structural unit of Comparative Example 9 in interaction with an adjoining naphthyl group-containing structural unit (general formulae (1a) and (1b)). Also when the structural unit containing a naphthyl group contains a urethane bond, the terminal naphthyl group has a high mobility because the naphthyl group is bonded with an ester group via a methylene group, which is considered to result in a weak interaction with an adjoining naphthyl group-containing structural unit (general formula (1c)).

Aspects of the present disclosure are as follows, for example.

<1> An ink including:

water;

a coloring material; and a copolymer, wherein the copolymer includes a structural unit represented by any one of general formulae (1a), (1b), and (1c) below and a structural unit containing an anionic group,

[General formula (1a)]

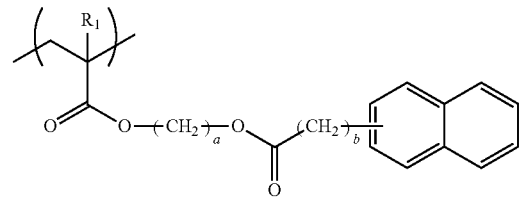

where in general formula (1a), $R_1$ represents any one of a hydrogen atom and a methyl group, a represents an integer of from 6 through 10, and b represents an integer of 0 or 1,

[General formula (1b)]

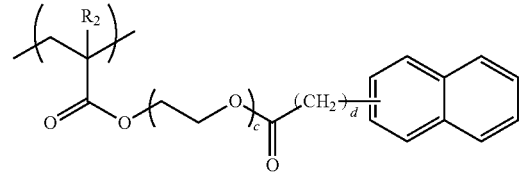

where in general formula (1b), $R_2$ represents any one of a hydrogen atom and a methyl group, c represents an integer of 3 or 4, and d represents an integer of 0 or 1,

[General formula (1c)]

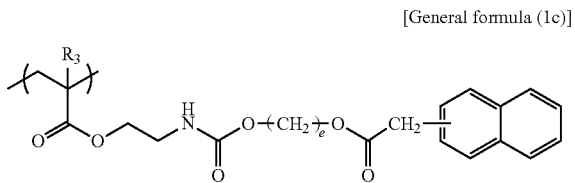

where in general formula (1c), $R_3$ represents any one of a hydrogen atom and a methyl group and e represents an integer of from 2 through 10.

<2> The ink according to <1>,
wherein the structural unit containing an anionic group contains a carboxyl group.

<3> The ink according to <1> or <2>,
wherein a proportion of the structural unit represented by any one of general formulae (1a), (1b), and (1c) in the copolymer is 75 percent by mass or greater but 90 percent by mass or less,
wherein a proportion of the structural unit containing an anionic group in the copolymer is 5 percent by mass or greater but 25 percent or less, and
wherein a total of the proportion of the structural unit containing an anionic group in the copolymer and the proportion of the structural unit represented by any one of general formulae (1a), (1b), and (1c) in the copolymer is 90 percent by mass or greater.

<4> The ink according to any one of <1> to <3>,
wherein a weight average molecular weight of the copolymer is 5,000 or greater but 40,000 or less.

<5> The ink according to any one of <1> to <4>,
wherein a proportion of the copolymer is 0.05 percent by mass or greater but 10 percent by mass or less.

<6> The ink according to any one of <1> to <5>,
wherein the coloring material is a pigment.

<7> The ink according to <6>,
wherein a proportion of the copolymer when the copolymer is used as a pigment dispersant is 1 part by mass or greater but 100 parts by mass or less relative to 100 parts by mass of the pigment.

<8> The ink according to any one of <1> to <7>, further including at least any one of an organic solvent and a surfactant.

<9> A method for producing an ink containing water, a coloring material, and a copolymer, the method including synthesizing the copolymer by radical polymerization of polymerizable materials that include a monomer represented by any one of general formulae (2a), (2b), and (2c) below and a monomer containing an anionic group,

[General formula (2a)]

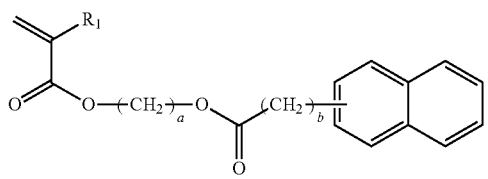

where in general formula (2a), $R_1$ represents any one of a hydrogen atom and a methyl group, a represents an integer of from 6 through 10, and b represents an integer of 0 or 1.

[General formula (2b)]

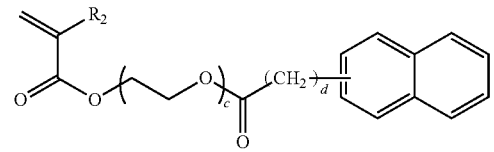

where in general formula (2b), $R_2$ represents any one of a hydrogen atom and a methyl group, c represents an integer of 3 or 4, and d represents an integer of 0 or 1,

[General formula (2c)]

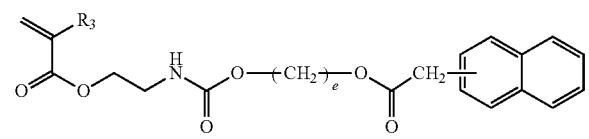

where in general formula (2c), $R_3$ represents any one of a hydrogen atom and a methyl group and e represents an integer of from 2 through 10.

<10> The method for producing an ink according to <9>,
wherein the monomer containing an anionic group is a monomer containing a carboxyl group.

<11> The method for producing an ink according to <9> or <10>,
wherein the monomer containing a carboxyl group is acrylic acid or methacrylic acid.

<12> The method for producing an ink according to any one of <9> to <11>,
wherein a weight average molecular weight of the copolymer is 5,000 or greater but 40,000 or less.

<13> An ink stored container including:
the ink according to any one of <1> to <8>; and
a container storing the ink.

<14> A printing apparatus including at least
an ink discharging unit configured to apply a stimulus to the ink according to any one of <1> to <8> to discharge the ink to print an image.

<15> The printing apparatus according to <14>,
wherein the stimulus is at least one selected from the group consisting of heat, pressure, vibration, and light.

<0.16> A printing method including at least
an ink discharging step of applying a stimulus to the ink according to any one of <1> to <8> to discharge the ink to print an image.

<17> The printing method according to <16>,
wherein the stimulus is at least one selected from the group consisting of heat, pressure, vibration, and light.

<18> An image formed matter including:
a print medium; and
an image formed on the print medium with the ink according to any one of <1> to <8>.

The ink according to any one of <1> to <8>, the method for producing an ink according to any one of <9> to <12>, the ink stored container according to <13>, the printing apparatus according to <14> or <15>, the printing method according to <16> or <17>, and the image formed matter according to <18> can solve the various problems in the related art and achieve the object of the present disclosure.

What is claimed is:

1. A polymer comprising:
a structural unit represented by any one of general formulae (1a), (1b), and (1c) below and a structural unit that comprises an anionic group,

[General formula (1a)]

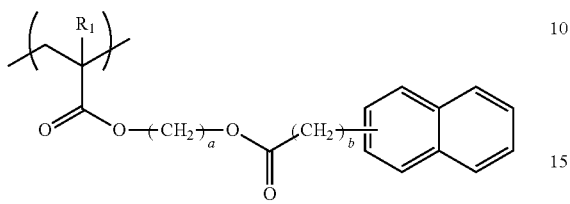

where in general formula (1a), $R_1$ represents any one of a hydrogen atom and a methyl group, a represents an integer of from 6 through 10, and b represents an integer of 0 or 1,

[General formula (1b)]

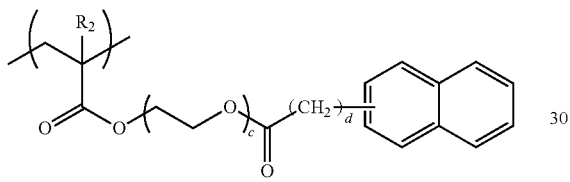

where in general formula (1b), $R_2$ represents any one of a hydrogen atom and a methyl group, c represents an integer of 3 or 4, and d represents an integer of 0 or 1,

[General formula (1c)]

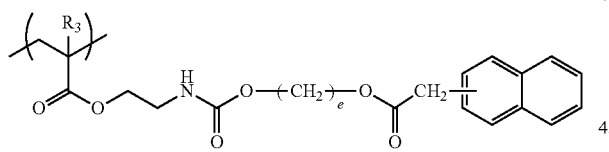

where in general formula (1c), $R_3$ represents any one of a hydrogen atom and a methyl group and e represents an integer of from 2 through 10.

2. The polymer according to claim 1,
wherein the structural unit that comprises an anionic group comprises a carboxyl group.

3. The polymer according to claim 1,
wherein a proportion of the structural unit represented by any one of general formulae (1a), (1b), and (1c) in the polymer is 75 percent by mass or greater but 90 percent by mass or less,
wherein a proportion of the structural unit that comprises an anionic group in the polymer is 5 percent by mass or greater but 25 percent or less, and
wherein a total of the proportion of the structural unit that comprises an anionic group in the polymer and the proportion of the structural unit represented by any one of general formulae (1a), (1b), and (1c) in the polymer is 90 percent by mass or greater.

4. The polymer according to claim 1,
wherein a weight average molecular weight of the polymer is 5,000 or greater but 40,000 or less.

5. A method for producing an ink that comprises water, a coloring material, and the polymer of claim 1, the method comprising
synthesizing the polymer by radical polymerization of polymerizable materials that comprise a monomer represented by any one of general formulae (2a), (2b), and (2c) below and a monomer that comprises an anionic group,

[General formula (2a)]

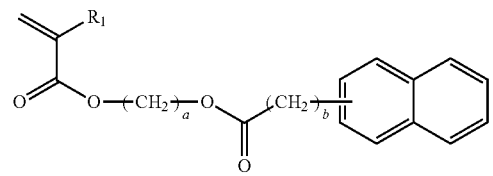

where in general formula (2a), $R_1$ represents any one of a hydrogen atom and a methyl group, a represents an integer of from 6 through 10, and b represents an integer of 0 or 1,

[General formula (2b)]

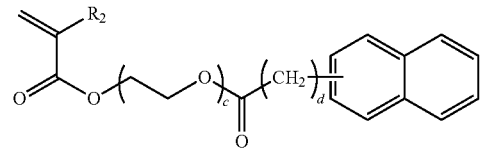

where in general formula (2b), $R_2$ represents any one of a hydrogen atom and a methyl group, c represents an integer of 3 or 4, and d represents an integer of 0 or 1,

[General formula (2c)]

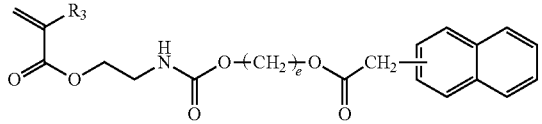

where in general formula (2c), $R_3$ represents any one of a hydrogen atom and a methyl group and e represents an integer of from 2 through 10.

6. A printing apparatus comprising
an ink discharging unit configured to apply a stimulus to an ink to discharge the ink to print an image,
wherein the ink comprises:
water;
a coloring material; and
the polymer of claim 1.

7. An ink comprising:
the polymer according to claim 1;
water; and
a coloring material.

8. The ink according to claim 7,
wherein the coloring material comprises a pigment.

9. The ink according to claim 7, further comprising
at least any one of an organic solvent and a surfactant.

10. An ink stored container comprising:
the ink according to claim 7; and
a container storing the ink.

11. A printing method comprising
applying a stimulus to the ink according to claim 7 to discharge the ink to print an image.

12. The polymer according to claim 1, wherein teh polymer is a copolymer.

* * * * *